(12) United States Patent
Howe et al.

(10) Patent No.: US 12,284,158 B2
(45) Date of Patent: Apr. 22, 2025

(54) CLOUD-BASED 5G SECURITY NETWORK ARCHITECTURES WITH WORKLOAD ISOLATION

(71) Applicant: Zscaler, Inc., San Jose, CA (US)

(72) Inventors: Nathan Howe, Frankfurt (DE); Kenneth B. Urquhart, Rancho Mirage, CA (US)

(73) Assignee: Zscaler, Inc., San Jose, CA (US)

( * ) Notice: Subject to any disclaimer, the term of this patent is extended or adjusted under 35 U.S.C. 154(b) by 636 days.

(21) Appl. No.: 17/491,819

(22) Filed: Oct. 1, 2021

(65) Prior Publication Data

US 2022/0286428 A1    Sep. 8, 2022

Related U.S. Application Data

(63) Continuation-in-part of application No. 17/371,408, filed on Jul. 9, 2021, now Pat. No. 11,765,593, and a continuation-in-part of application No. 17/194,568, filed on Mar. 8, 2021, now Pat. No. 11,596,027.

(51) Int. Cl.
*H04L 9/40* (2022.01)
*H04W 28/08* (2023.01)
*H04W 28/12* (2009.01)

(52) U.S. Cl.
CPC ........ *H04L 63/029* (2013.01); *H04L 63/0227* (2013.01); *H04L 63/1425* (2013.01); *H04W 28/0925* (2020.05); *H04W 28/12* (2013.01)

(58) Field of Classification Search
CPC ............... H04L 63/029; H04L 63/0227; H04L 63/1425; H04W 28/0925; H04W 28/12

USPC ........................................................... 726/11
See application file for complete search history.

(56) References Cited

U.S. PATENT DOCUMENTS

| | | | |
|---|---|---|---|
| 7,894,350 B2 | 2/2011 | Kailash et al. | |
| 8,010,085 B2 | 8/2011 | Apte et al. | |
| 8,259,571 B1 | 9/2012 | Raphel et al. | |
| 8,458,786 B1 | 6/2013 | Kailash et al. | |
| 8,464,335 B1 | 6/2013 | Sinha et al. | |
| 9,350,644 B2 | 5/2016 | Desai et al. | |
| 9,473,537 B2 | 10/2016 | Sinha et al. | |
| 9,531,758 B2 | 12/2016 | Devarajan et al. | |
| 10,375,024 B2 | 8/2019 | Foxhoven et al. | |
| 10,609,083 B2 | 3/2020 | Kailash et al. | |
| 10,728,246 B2 | 7/2020 | Bansal | |
| 11,882,000 B2 * | 1/2024 | Chandrashekhar | H04L 63/0209 |
| 12,212,491 B2 * | 1/2025 | Atwal | H04L 63/0428 |
| 2015/0372982 A1 | 12/2015 | Herle et al. | |
| 2016/0012251 A1 * | 1/2016 | Singh | G06F 21/6227 |
| | | | 707/783 |
| 2016/0150350 A1 * | 5/2016 | Ingale | H04W 4/38 |
| | | | 370/255 |

(Continued)

*Primary Examiner* — Tauqir Hussain
(74) *Attorney, Agent, or Firm* — Baratta Law PLLC; Lawrence A. Baratta, Jr.; Matthew R. Gore

(57) ABSTRACT

Cloud-based 5G security, implemented in a Multi-Access Edge Compute (MEC) system, includes steps of receiving a request for compute resources from User Equipment (UE); validating a user of the UE for the compute resources; responsive to the user being authorized, creating a connection between the UE and a destination of the compute resources; responsive to the user being unauthorized, rendering the compute resources as hidden from the UE. The steps can include utilizing a cloud-based system for control and signaling the connection.

18 Claims, 28 Drawing Sheets

(56) References Cited

U.S. PATENT DOCUMENTS

| | | | |
|---|---|---|---|
| 2020/0077265 A1 | 3/2020 | Singh et al. | |
| 2020/0336913 A1 | 10/2020 | Pampati et al. | |
| 2021/0117249 A1* | 4/2021 | Doshi | H04L 67/1001 |
| 2021/0160237 A1* | 5/2021 | Rozner | H04L 9/3213 |
| 2022/0247678 A1* | 8/2022 | Atwal | H04L 45/645 |
| 2022/0385458 A1* | 12/2022 | Keith, Jr. | A61B 5/0077 |
| 2022/0393952 A1* | 12/2022 | Mortsolf | H04L 43/045 |
| 2022/0408333 A1* | 12/2022 | Ryu | H04W 76/12 |
| 2023/0106024 A1* | 4/2023 | Keith, Jr. | G16H 40/63 |
| | | | 726/5 |
| 2023/0107624 A1* | 4/2023 | Keith, Jr. | G06F 21/32 |
| | | | 704/249 |
| 2023/0114650 A1* | 4/2023 | Keith, Jr. | G06F 21/316 |
| | | | 726/7 |
| 2023/0126039 A1* | 4/2023 | Bichot | H04L 67/568 |
| | | | 370/329 |
| 2024/0022565 A1* | 1/2024 | Keith, Jr. | H04L 63/0861 |
| 2024/0112008 A1* | 4/2024 | Malik | G06N 3/08 |
| 2024/0259857 A1* | 8/2024 | Zhu | H04W 28/0263 |
| 2024/0267783 A1* | 8/2024 | Howe | H04L 47/2408 |
| 2025/0031048 A1* | 1/2025 | Verma | H04W 12/37 |

* cited by examiner

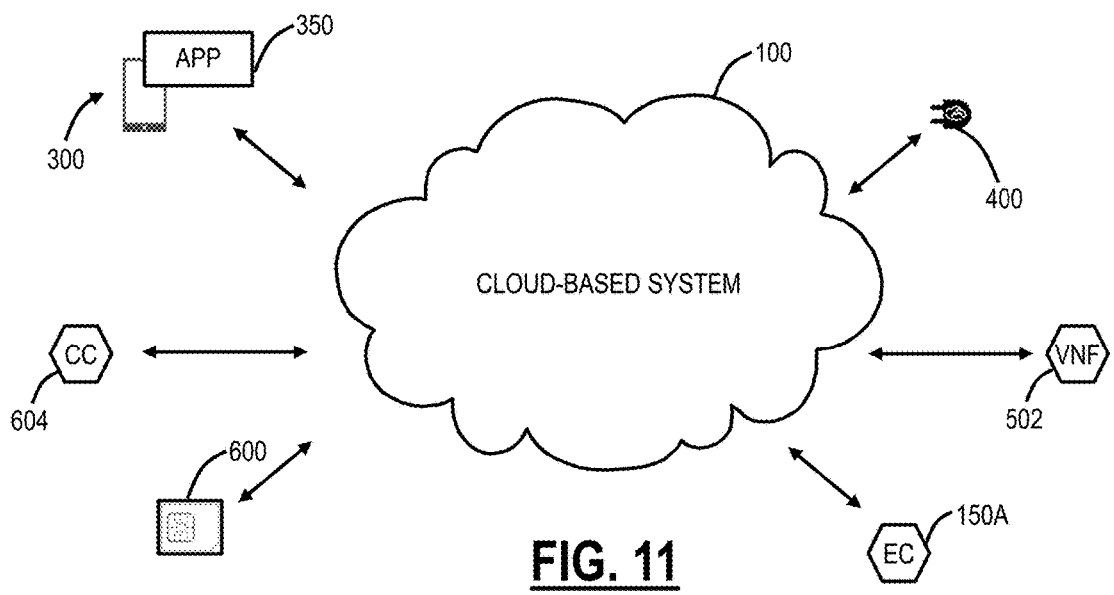
FIG. 11
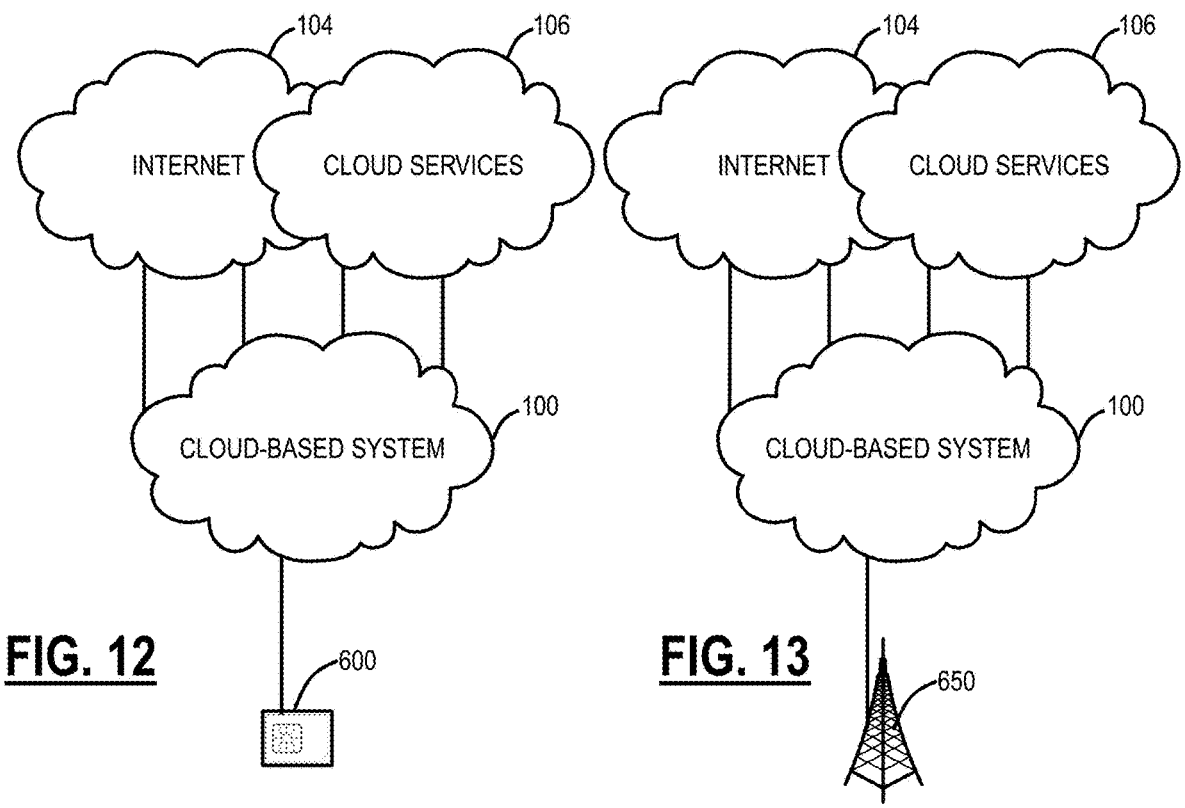
FIG. 12
FIG. 13

CLOUD-BASED 5G SECURITY NETWORK ARCHITECTURES WITH WORKLOAD ISOLATION

CROSS-REFERENCE TO RELATED APPLICATION(S)

The present disclosure relates is a continuation-in-part of U.S. patent application Ser. No. 17/194,568, filed Mar. 8, 2021, entitled "Mobile and IoT device forwarding to the cloud," and a continuation-in-part of U.S. patent application Ser. No. 17/371,408, filed Jul. 9, 2021, entitled "Cloud-based 5G security network architectures," the contents of each are incorporated by reference in their entirety.

FIELD OF THE DISCLOSURE

The present disclosure relates generally to networking and computing. More particularly, the present disclosure relates to systems and methods for cloud-based 5G security network architectures, intelligent steering, workload isolation, and secure edge steering.

BACKGROUND OF THE DISCLOSURE

Fifth generation (5G) wireless deployments are ongoing. 5G means more data, more services, and more devices. The traditional view of an enterprise network (i.e., corporate, private, etc.) included a well-defined perimeter defended by various appliances (e.g., firewalls, intrusion prevention, advanced threat detection, etc.). In this traditional view, mobile users utilize a Virtual Private Network (VPN), etc. and have their traffic backhauled into the well-defined perimeter. This worked when mobile users represented a small fraction of the users, i.e., most users were within the well-defined perimeter. However, this is no longer the case—the definition of the workplace is no longer confined to within the well-defined perimeter. 5G provides connection speeds rivaling wired speeds and drives significant increases in network traffic volumes. This results in an increased risk for enterprise data residing on unsecured and unmanaged devices as well as the security risks in access to the Internet.

Security is a key 5G design principle. 5G is secure where 5G was designed to be secure, but the security is limited to the 5G network itself, not for the workloads running on top of the 5G network. That is, applications and services running on 5G networks that are not associated directly with network traffic management cannot be assumed to be secure. Application providers are responsible for end-to-end service security.

Cloud-based security solutions have emerged, such as Zscaler Internet Access (ZIA) and Zscaler Private Access (ZPA), available from Zscaler, Inc., the applicant and assignee of the present application. These cloud-based services operate inline between User Equipment (UE) and the Internet. However, many 5G use cases do not require moving data between the UE and the cloud, but rather data between the UE and Multiaccess Edge Compute (MECs) devices available physically close to the UE to reduce network latency. When the MEC is owned by the customer (or leased/subscribed) by the customer from the 5G network service provider, this arrangement can be used to limit the amount of UE data traffic traversing farther into the 5G network for reasons of privacy or cost.

BRIEF SUMMARY OF THE DISCLOSURE

The present disclosure relates to systems and methods for cloud-based 5G security network architectures intelligent steering, workload isolation, and secure edge steering. Specifically, various approaches are described to integrate cloud-based security services into Multiaccess Edge Compute servers (MECs). That is, existing cloud-based security services are in line between a UE and the Internet. The present disclosure includes integrating the cloud-based security services and associated cloud-based system within service provider's MECs. In this manner, a cloud-based security service can be integrated with a service provider's 5G network or a 5G network privately operated by the customer. For example, nodes in a cloud-based system can be collocated within a service provider's network, to provide security functions to 5G users or connected by peering from the cloud-based security service into the 5G service provider's regional communications centers.

Intelligent steering includes actively identifying traffic types from User Equipment (UE—a reference to any wireless device equipped with a SIM/eSIM/iSIM/other attached to a telecommunications network) and steering this traffic to the most effective edge for processing, securing, logging, etc. The goal is to provide intelligent use of edge computing resources. Workload isolation includes isolating internal edge workloads from unauthorized exposure, use, or discovery, ensuring that workloads can only be accessed by authorized entities or processes. Secure edge steering includes access from User Equipment (UE) to edge hosted workloads through dynamic, unique, and encrypted tunnels on a per-app, per-session basis, not reliant on underlying mobile network transports (e.g., S1/SGi/F1/IP), 5G network slicing, or TCP/IP networks for security. This will provide protection whether the Radio Access Network (RAN) architecture secures traffic between UE and edge workloads or not. It will also work regardless of the location of the edge or the latency range (e.g., deep edge with <1 ms latency, far edge with <5 ms latency, near edge with 5-20 ms latency, or any other edge and latency combination).

BRIEF DESCRIPTION OF THE DRAWINGS

The present disclosure is illustrated and described herein with reference to the various drawings, in which like reference numbers are used to denote like system components/method steps, as appropriate, and in which:

FIG. 3 is a block diagram of a server that may be used in the cloud-based system of FIGS. 1 and 2 or the like.

FIG. 4 is a block diagram of a user device that may be used with the cloud-based system of FIGS. 1 and 2 or the like.

FIG. 11 is a diagram illustrating various techniques to forward traffic to the cloud-based system.

FIG. 12 is a diagram of a ESIM/iSIM/SIM-card-based approach for network path and connectivity to the cloud-based system.

FIG. 13 is a diagram of an Application-aware Networking (APN) approach with a mobile network for network path and connectivity to the cloud-based system.

DETAILED DESCRIPTION OF THE DISCLOSURE

Figure 1:
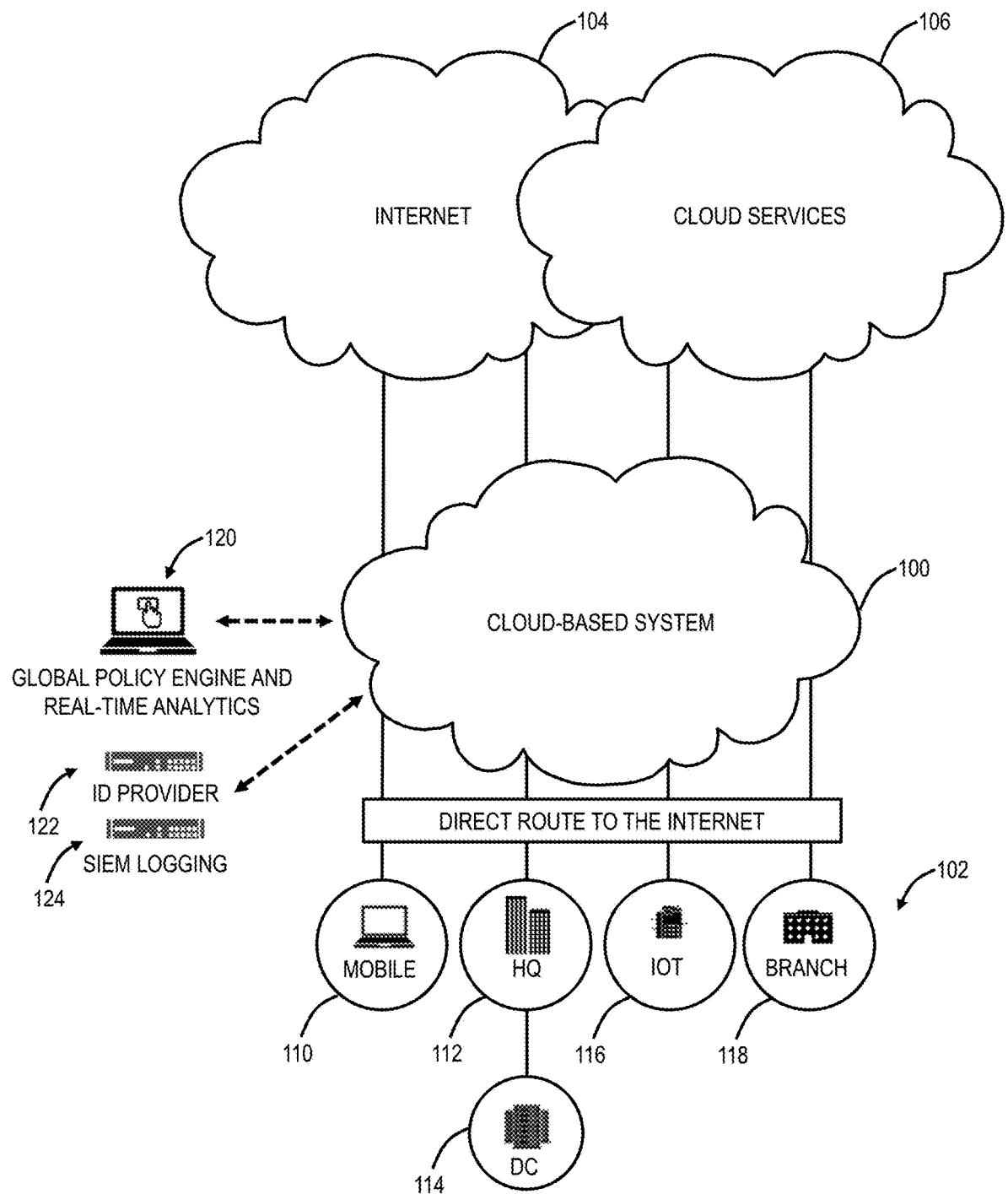
FIG. 1 is a network diagram of a cloud-based system offering security as a service.

Again, the present disclosure relates to systems and methods for cloud-based 5G security network architectures. Specifically, various approaches are described to integrate cloud-based security services in Multiaccess Edge Compute systems (MECs). That is, existing cloud-based security services are in line between a UE and the Internet. The present disclosure includes integrating the cloud-based security services and associated cloud-based system within service provider's MECs. In this manner, a cloud-based security service can be integrated with a service provider's 5G network. For example, nodes in a cloud-based system can be collocated within a service provider's network, to provide security functions to 5G users.

Of note, 5G is emerging amidst a general decline in service provider revenue. There is a need for service providers to provide additional services for new revenue sources, as opposed to being a simple pipe for network connectivity. Integrating existing cloud-based security services in the service provider's MECs provides an opportunity to offer additional, value-added services.

The present disclosure focuses on traffic forwarding techniques that either will not require a user ID, a forwarding gateway, etc., or conversely leverage an intelligent service to direct, control and protect traffic from a UE device, going to the Internet. In an embodiment, the present disclosure includes use of a SIM card, and/or a functionally equivalent digital embedded SIM (eSIM) or integrated SIM (iSIM) that executes code thereon for implementing a tunnel to a cloud-based system. In another embodiment, a secure edge service of a network is configured for forwarding traffic to the cloud-based system. Advantageously, these approaches are ideal for IoT and similar devices.

Intelligent steering includes actively identifying traffic types from User Equipment (UE—a reference to any wireless device equipped with a SIM/eSIM/iSIM/other attached to a telecommunications network) and steering this traffic to the most effective edge for processing, securing, logging, etc. The goal is to provide intelligent use of edge computing resources. Workload isolation includes isolating internal edge workloads from unauthorized exposure, use, or discovery, ensuring that workloads can only be accessed by authorized entities or processes. Secure edge steering includes access from User Equipment (UE) to edge hosted workloads through dynamic, unique, and encrypted tunnels on a per-app, per-session basis, not reliant on underlying mobile network transports (e.g., S1/SGi/F1/IP), 5G network slicing, or TCP/IP networks for security. This will provide protection whether the Radio Access Network (RAN) architecture secures traffic between UE and edge workloads or not. It will also work regardless of the location of the edge or the latency range (e.g., deep edge with <1 ms latency, far edge with <5 ms latency, near edge with 5-20 ms latency, or any other edge and latency combination). As described herein, a workload can be an application or any online resources being requested by a UE 300.

§ 1.0 Example Cloud-Based System Architecture

FIG. 1 is a network diagram of a cloud-based system 100 offering security as a service. Specifically, the cloud-based system 100 can offer a Secure Internet and Web Gateway as a service to various users 102, as well as other cloud services. In this manner, the cloud-based system 100 is located between the users 102 and the Internet as well as any cloud services 106 (or applications) accessed by the users 102. As such, the cloud-based system 100 provides inline monitoring inspecting traffic between the users 102, the Internet 104, and the cloud services 106, including Secure Sockets Layer (SSL) traffic. The cloud-based system 100 can offer access control, threat prevention, data protection, etc. The access control can include a cloud-based firewall, cloud-based intrusion detection, Uniform Resource Locator (URL) filtering, bandwidth control, Domain Name System (DNS) filtering, etc. Threat prevention can include cloud-based intrusion prevention, protection against advanced threats (malware, spam, Cross-Site Scripting (XSS), phishing, etc.), cloud-based sandbox, antivirus, DNS security, etc. The data protection can include Data Loss Prevention (DLP), cloud application security such as via a Cloud Access Security Broker (CASB), file type control, etc.

The cloud-based firewall can provide Deep Packet Inspection (DPI) and access controls across various ports and protocols as well as being application and user aware. The URL filtering can block, allow, or limit website access based on policy for a user, group of users, or entire organization, including specific destinations or categories of URLs (e.g., gambling, social media, etc.). The bandwidth control can enforce bandwidth policies and prioritize critical applications such as relative to recreational traffic. DNS filtering can control and block DNS requests against known and malicious destinations.

The cloud-based intrusion prevention and advanced threat protection can deliver full threat protection against malicious content such as browser exploits, scripts, identified botnets and malware callbacks, etc. The cloud-based sandbox can block zero-day exploits (just identified) by analyzing unknown files for malicious behavior. Advantageously, the cloud-based system 100 is multi-tenant and can service a large volume of the users 102. As such, newly discovered threats can be promulgated throughout the cloud-based system 100 for all tenants practically instantaneously. The antivirus protection can include antivirus, antispyware, anti-malware, etc. protection for the users 102, using signatures sourced and constantly updated. The DNS security can identify and route command-and-control connections to threat detection engines for full content inspection.

The DLP can use standard and/or custom dictionaries to continuously monitor the users 102, including compressed and/or SSL-encrypted traffic. Again, being in a cloud implementation, the cloud-based system 100 can scale this monitoring with near-zero latency on the users 102. The cloud application security can include CASB functionality to discover and control user access to known and unknown cloud services 106. The file type controls enable true file type control by the user, location, destination, etc. to determine which files are allowed or not.

The cloud-based system 100 can provide other security functions, including, for example, micro-segmentation, workload segmentation, API security, Cloud Security Posture Management (CSPM), user identity management, and the like. That is, the cloud-based system 100 provides a network architecture that enables delivery of any cloud-based security service, including emerging frameworks.

Figure 5:
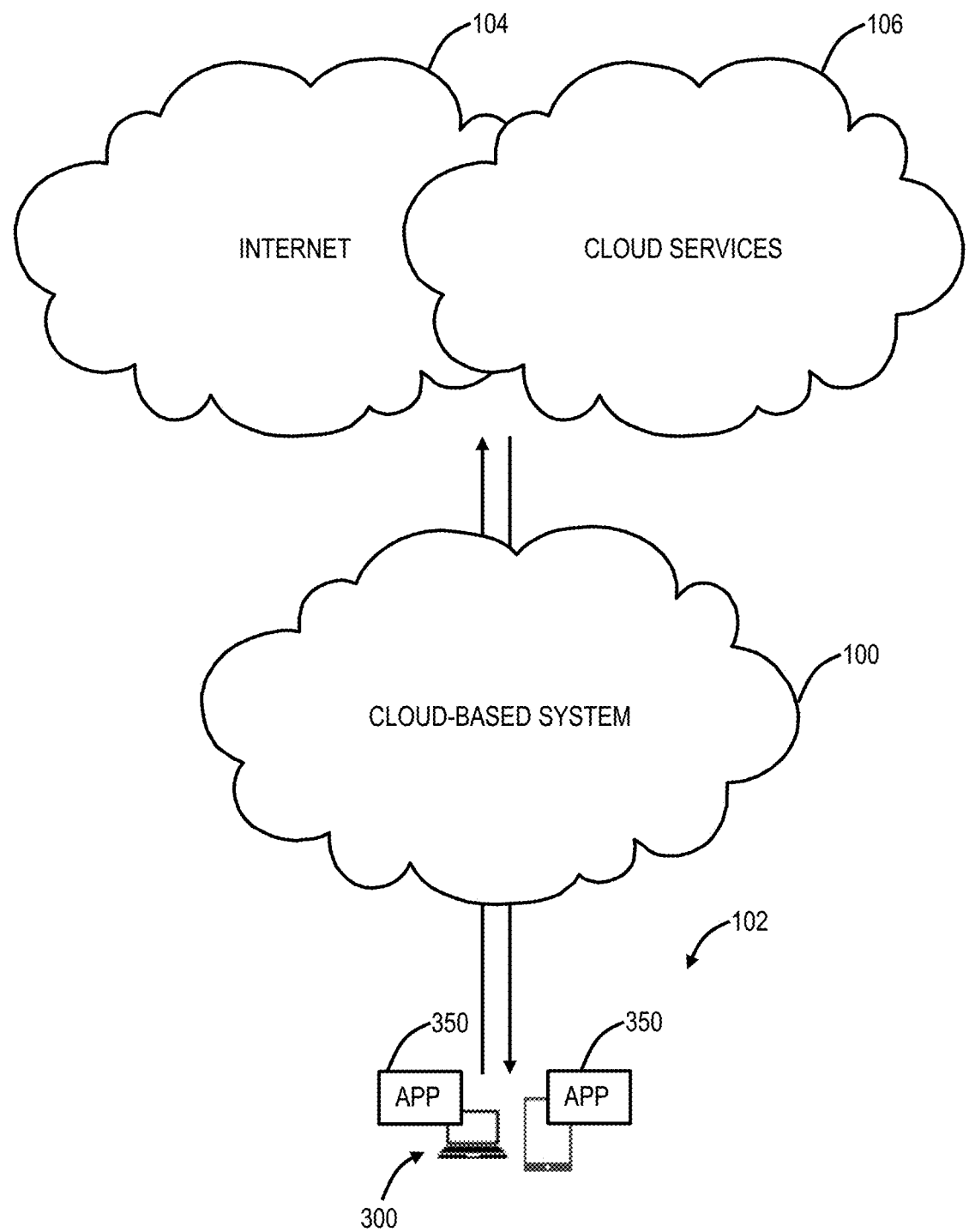
FIG. 5 is a network diagram of the cloud-based system illustrating an application on user devices with users configured to operate through the cloud-based system.

For illustration purposes, the users 102 of the cloud-based system 100 can include a mobile device 110, a headquarters (HQ) 112 which can include or connect to a data center (DC) 114, Internet of Things (IoT) devices 116, a branch office/remote location 118, etc., and each includes one or more user devices (an example user device 300 (User Equipment (UE)) is illustrated in FIG. 5). The devices 110, 116, and the locations 112, 114, 118 are shown for illustrative purposes, and those skilled in the art will recognize there are various access scenarios and other users 102 for the cloud-based system 100, all of which are contemplated herein. The users 102 can be associated with a tenant, which may include an enterprise, a corporation, an organization, etc. That is, a tenant is a group of users who share a common access with specific privileges to the cloud-based system 100, a cloud service, etc. In an embodiment, the headquarters 112 can include an enterprise's network with resources in the data center 114. The mobile device 110 can be a so-called road warrior, i.e., users that are off-site, on-the-road, etc. Those skilled in the art will recognize a user 102 has to use a corresponding user device 300 for accessing the cloud-based system 100 and the like, and the description herein may use the user 102 and/or the user device 300 interchangeably.

Further, the cloud-based system 100 can be multi-tenant, with each tenant having its own users 102 and configuration, policy, rules, etc. One advantage of the multi-tenancy and a large volume of users is the zero-day/zero-hour protection in that a new vulnerability can be detected and then instantly remediated across the entire cloud-based system 100. The same applies to policy, rule, configuration, etc. changes—they are instantly remediated across the entire cloud-based system 100. As well, new features in the cloud-based system 100 can also be rolled up simultaneously across the user base, as opposed to selective and time-consuming upgrades on every device at the locations 112, 114, 118, and the devices 110, 116.

Logically, the cloud-based system 100 can be viewed as an overlay network between users (at the locations 112, 114, 118, and the devices 110, 116) and the Internet 104 and the cloud services 106. Previously, the IT deployment model included enterprise resources and applications stored within the data center 114 (i.e., physical devices) behind a firewall (perimeter), accessible by employees, partners, contractors, etc. on-site or remote via Virtual Private Networks (VPNs), etc. The cloud-based system 100 is replacing the conventional deployment model. The cloud-based system 100 can be used to implement these services in the cloud without requiring the physical devices and management thereof by enterprise IT administrators. As an ever-present overlay network, the cloud-based system 100 can provide the same functions as the physical devices and/or appliances regardless of geography or location of the users 102, as well as independent of platform, operating system, network access technique, network access provider, etc.

There are various techniques to forward traffic between the users 102 at the locations 112, 114, 118, and via the devices 110, 116, and the cloud-based system 100. Typically, the locations 112, 114, 118 can use tunneling where all traffic is forward through the cloud-based system 100. For example, various tunneling protocols are contemplated, such as GRE, L2TP, IPsec, customized tunneling protocols, etc. The devices 110, 116, when not at one of the locations 112, 114, 118 can use a local application that forwards traffic, a proxy such as via a Proxy Auto-Config (PAC) file, and the like. An application of the local application is the application 350 described in detail herein as a connector application. A key aspect of the cloud-based system 100 is all traffic between the users 102 and the Internet 104 or the cloud services 106 is via the cloud-based system 100. As such, the cloud-based system 100 has visibility to enable various functions, all of which are performed off the user device in the cloud.

The cloud-based system 100 can also include a management system 120 for tenant access to provide global policy and configuration as well as real-time analytics. This enables IT administrators to have a unified view of user activity, threat intelligence, application usage, etc. For example, IT administrators can drill-down to a per-user level to understand events and correlate threats, to identify compromised devices, to have application visibility, and the like. The cloud-based system 100 can further include connectivity to an Identity Provider (IDP) 122 for authentication of the users 102 and to a Security Information and Event Management (SIEM) system 124 for event logging. The system 124 can provide alert and activity logs on a per-user 102 basis.

Figure 2:
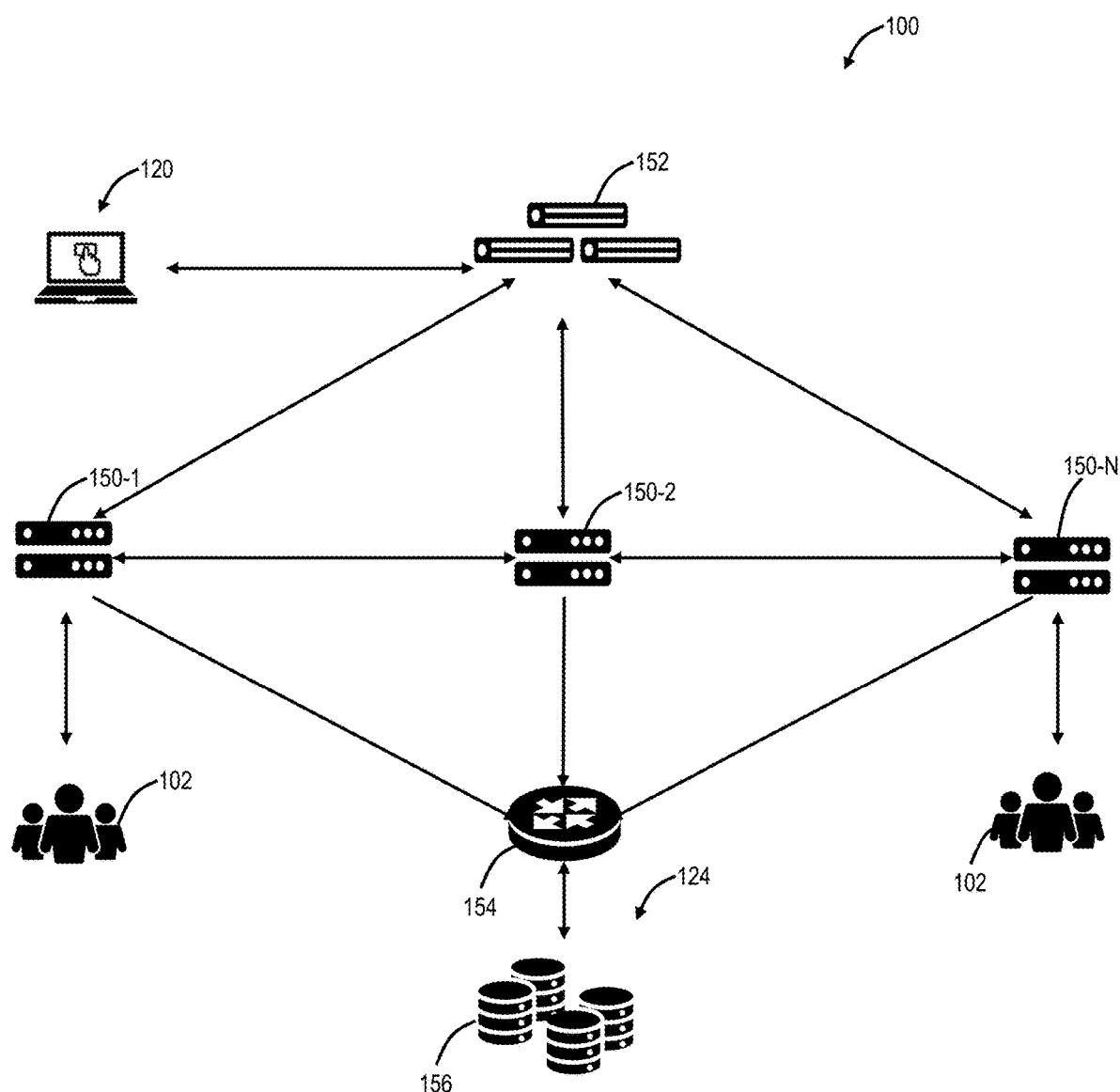
FIG. 2 is a network diagram of an example implementation of the cloud-based system.
Figure 4:
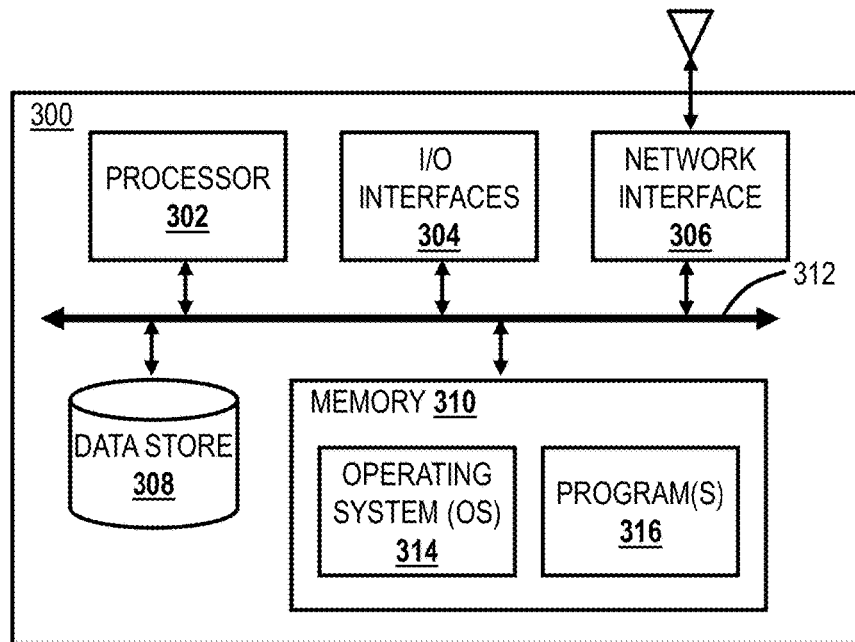

FIG. 2 is a network diagram of an example implementation of the cloud-based system 100. In an embodiment, the cloud-based system 100 includes a plurality of enforcement nodes (EN) 150, labeled as enforcement nodes 150-1, 150-2, 150-N, interconnected to one another and interconnected to a central authority (CA) 152. Note, the nodes 150 are called "enforcement" nodes 150 but they can be simply referred to as nodes 150 in the cloud-based system 100. Also, the nodes 150 can be referred to as service edges. The nodes 150 and the central authority 152, while described as nodes, can include one or more servers, including physical servers, virtual machines (VM) executed on physical hardware, etc. An example of a server is illustrated in FIG. 4. The cloud-based system 100 further includes a log router 154 that connects to a storage cluster 156 for supporting log maintenance from the enforcement nodes 150. The central authority 152 provide centralized policy, real-time threat updates, etc. and coordinates the distribution of this data between the enforcement nodes 150. The enforcement nodes 150 provide an onramp to the users 102 and are configured to execute policy, based on the central authority 152, for each user 102. The enforcement nodes 150 can be geographically distributed, and the policy for each user 102 follows that user 102 as he or she connects to the nearest (or other criteria) enforcement node 150. Of note, the cloud-based system is an external system meaning it is separate from the tenant's private networks (enterprise networks) as well as from networks associated with the devices 110, 116, and locations 112, 118.

The enforcement nodes 150 are full-featured secure internet gateways that provide integrated internet security. They inspect all web traffic bi-directionally for malware and enforce security, compliance, and firewall policies, as described herein, as well as various additional functionality. In an embodiment, each enforcement node 150 has two main modules for inspecting traffic and applying policies: a web module and a firewall module. The enforcement nodes 150 are deployed around the world and can handle hundreds of thousands of concurrent users with millions of concurrent sessions. Because of this, regardless of where the users 102 are, they can access the Internet 104 from any device, and the enforcement nodes 150 protect the traffic and apply corporate policies. The enforcement nodes 150 can implement various inspection engines therein, and optionally, send sandboxing to another system. The enforcement nodes 150 include significant fault tolerance capabilities, such as deployment in active-active mode to ensure availability and redundancy as well as continuous monitoring.

In an embodiment, customer traffic is not passed to any other component within the cloud-based system 100, and the enforcement nodes 150 can be configured never to store any data to disk. Packet data is held in memory for inspection and then, based on policy, is either forwarded or dropped. Log data generated for every transaction is compressed, tokenized, and exported over secure Transport Layer Security (TLS) connections to the log routers 154 that direct the logs to the storage cluster 156, hosted in the appropriate geographical region, for each organization. In an embodiment, all data destined for or received from the Internet is processed through one of the enforcement nodes 150. In another embodiment, specific data specified by each tenant, e.g., only email, only executable files, etc., is processed through one of the enforcement nodes 150.

Each of the enforcement nodes 150 may generate a decision vector $D=[d1, d2, \ldots, dn]$ for a content item of one or more parts $C=[c1, c2, \ldots, cm]$. Each decision vector may identify a threat classification, e.g., clean, spyware, malware, undesirable content, innocuous, spam email, unknown, etc. For example, the output of each element of the decision vector D may be based on the output of one or more data inspection engines. In an embodiment, the threat classification may be reduced to a subset of categories, e.g., violating, non-violating, neutral, unknown. Based on the subset classification, the enforcement node 150 may allow the distribution of the content item, preclude distribution of the content item, allow distribution of the content item after a cleaning process, or perform threat detection on the content item. In an embodiment, the actions taken by one of the enforcement nodes 150 may be determinative on the threat classification of the content item and on a security policy of the tenant to which the content item is being sent from or from which the content item is being requested by. A content item is violating if, for any part $C=[c1, c2, \ldots, cm]$ of the content item, at any of the enforcement nodes 150, any one of the data inspection engines generates an output that results in a classification of "violating."

The central authority 152 hosts all customer (tenant) policy and configuration settings. It monitors the cloud and provides a central location for software and database updates and threat intelligence. Given the multi-tenant architecture, the central authority 152 is redundant and backed up in multiple different data centers. The enforcement nodes 150 establish persistent connections to the central authority 152 to download all policy configurations. When a new user connects to an enforcement node 150, a policy request is sent to the central authority 152 through this connection. The central authority 152 then calculates the policies that apply to that user 102 and sends the policy to the enforcement node 150 as a highly compressed bitmap.

The policy can be tenant-specific and can include access privileges for users, websites and/or content that is disallowed, restricted domains, DLP dictionaries, etc. Once downloaded, a tenant's policy is cached until a policy change is made in the management system 120. The policy can be tenant-specific and can include access privileges for users, websites and/or content that is disallowed, restricted domains, DLP dictionaries, etc. When this happens, all of the cached policies are purged, and the enforcement nodes 150 request the new policy when the user 102 next makes a request. In an embodiment, the enforcement nodes 150 exchange "heartbeats" periodically, so all enforcement nodes 150 are informed when there is a policy change. Any enforcement node 150 can then pull the change in policy when it sees a new request.

The cloud-based system 100 can be a private cloud, a public cloud, a combination of a private cloud and a public cloud (hybrid cloud), or the like. Cloud computing systems and methods abstract away physical servers, storage, networking, etc., and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. Centralization gives cloud service providers complete control over the versions of the browser-based and other applications provided to clients, which removes the need for version upgrades or license management on individual client computing devices. The phrase "Software as a Service" (SaaS) is sometimes used to describe application programs offered through cloud computing. A common shorthand for a provided cloud computing service (or even an aggregation of all existing cloud services) is "the cloud." The cloud-based system 100 is illustrated herein as an example embodiment of a cloud-based system, and other implementations are also contemplated.

As described herein, the terms cloud services and cloud applications may be used interchangeably. The cloud service 106 is any service made available to users on-demand via the Internet, as opposed to being provided from a company's on-premises servers. A cloud application, or cloud app, is a software program where cloud-based and local components work together. The cloud-based system 100 can be utilized to provide example cloud services, including Zscaler Internet Access (ZIA), Zscaler Private Access (ZPA), and Zscaler Digital Experience (ZDX), all from Zscaler, Inc. (the assignee and applicant of the present application). Also, there can be multiple different cloud-based systems 100, including ones with different architectures and multiple cloud services. The ZIA service can provide the access control, threat prevention, and data protection described above with reference to the cloud-based system 100. ZPA can include access control, microservice segmentation, etc. The ZDX service can provide monitoring of user experience, e.g., Quality of Experience (QoE), Quality of Service (QoS), etc., in a manner that can gain insights based on continuous, inline monitoring. For example, the ZIA service can provide a user with Internet Access, and the ZPA service can provide a user with access to enterprise resources instead of traditional Virtual Private Networks (VPNs), namely ZPA provides Zero Trust Network Access (ZTNA). Those of ordinary skill in the art will recognize various other types of cloud services 106 are also contemplated. Also, other types of cloud architectures are also contemplated, with the cloud-based system 100 presented for illustration purposes.

§ 1.1 Private Nodes Hosted by Tenants or Service Providers

The nodes 150 that service multi-tenant users 102 may be located in data centers. These nodes 150 can be referred to as public nodes 150 or public service edges. In embodiment, the nodes 150 can be located on-premises with tenants (enterprise) as well as service providers. These nodes can be referred to as private nodes 150 or private service edges. In operation, these private nodes 150 can perform the same functions as the public nodes 150, can communicate with the central authority 152, and the like. In fact, the private nodes 150 can be considered in the same cloud-based system 100 as the public nodes 150, except located on-premises. When a private node 150 is located in an enterprise network, the private node 150 can have a single tenant corresponding to the enterprise; of course, the cloud-based system 100 is still multi-tenant, but these particular nodes are serving only a single tenant. When a private node 150 is located in a service provider's network, the private node 150 can be multi-tenant for customers of the service provider. Those skilled in the art will recognize various architectural approaches are contemplated. The cloud-based system 100 is a logical construct providing a security service.

§ 2.0 User Device Application for Traffic Forwarding and Monitoring

Figure 3:
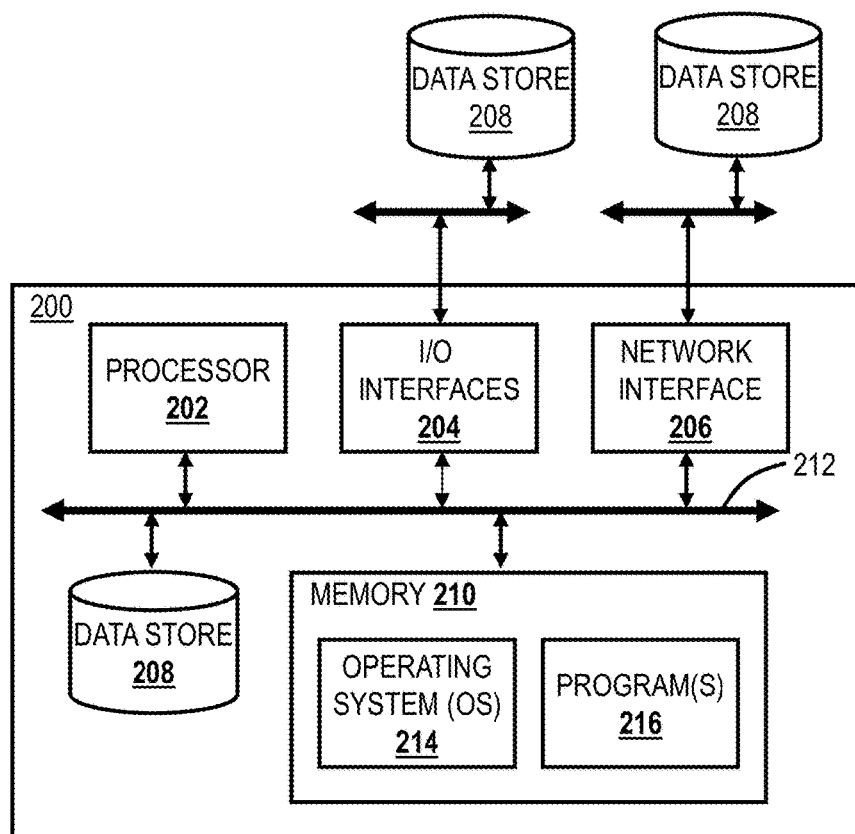

FIG. 3 is a network diagram of the cloud-based system 100 illustrating an application 350 on user devices 300 with users 102 configured to operate through the cloud-based system 100. Different types of user devices 300 are proliferating, including Bring Your Own Device (BYOD) as well as IT-managed devices. The conventional approach for a user device 300 to operate with the cloud-based system 100 as well as for accessing enterprise resources includes complex policies, VPNs, poor user experience, etc. The application 350 can automatically forward user traffic with the cloud-based system 100 as well as ensuring that security and access policies are enforced, regardless of device, location, operating system, or application. The application 350 automatically determines if a user 102 is looking to access the open Internet 104, a SaaS app, or an internal app running in public, private, or the datacenter and routes mobile traffic through the cloud-based system 100. The application 350 can support various cloud services, including ZIA, ZPA, ZDX, etc., allowing the best-in-class security with zero trust access to internal apps. As described herein, the application 350 can also be referred to as a connector application.

The application 350 is configured to auto-route traffic for seamless user experience. This can be protocol as well as application-specific, and the application 350 can route traffic with a nearest or best fit enforcement node 150. Further, the application 350 can detect trusted networks, allowed applications, etc. and support secure network access. The application 350 can also support the enrollment of the user device 300 prior to accessing applications. The application 350 can uniquely detect the users 102 based on fingerprinting the user device 300, using criteria like device model, platform, operating system, etc. The application 350 can support Mobile Device Management (MDM) functions, allowing IT personnel to deploy and manage the user devices 300 seamlessly. This can also include the automatic installation of client and SSL certificates during enrollment. Finally, the application 350 provides visibility into device and app usage of the user 102 of the user device 300.

The application 350 supports a secure, lightweight tunnel between the user device 300 and the cloud-based system 100. For example, the lightweight tunnel can be HTTP-based. With the application 350, there is no requirement for PAC files, an IPsec VPN, authentication cookies, or user 102 setup.

§ 3.0 Example Server Architecture

FIG. 4 is a block diagram of a server 200, which may be used in the cloud-based system 100, in other systems, or standalone. For example, the enforcement nodes 150 and the central authority 152 may be formed as one or more of the servers 200. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 4 depicts the server 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a Central Processing Unit (CPU), an auxiliary processor among several processors associated with the server 200, a semiconductor-based microprocessor (in the form of a microchip or chipset), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components.

The network interface 206 may be used to enable the server 200 to communicate on a network, such as the Internet 104. The network interface 206 may include, for example, an Ethernet card or adapter or a Wireless Local Area Network (WLAN) card or adapter. The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof.

Moreover, the data store 208 may incorporate electronic, magnetic, optical, and/or other types of storage media. In one example, the data store 208 may be located internal to the server 200, such as, for example, an internal hard drive connected to the local interface 212 in the server 200. Additionally, in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network-attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable Operating System (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

§ 4.0 Example User Device Architecture

FIG. 5 is a block diagram of a user device 300, which may be used with the cloud-based system 100 or the like. Specifically, the user device 300 can form a device used by one of the users 102, and this may include common devices such as laptops, smartphones, tablets, netbooks, personal digital assistants, MP3 players, cell phones, e-book readers, IoT devices, servers, desktops, printers, televisions, streaming media devices, and the like. The user device 300 can be a digital device that, in terms of hardware architecture, generally includes a processor 302, I/O interfaces 304, a network interface 306, a data store 308, and memory 310. It should be appreciated by those of ordinary skill in the art that FIG. 5 depicts the user device 300 in an oversimplified manner, and a practical embodiment may include additional components and suitably configured processing logic to support known or conventional operating features that are not described in detail herein. The components (302, 304, 306, 308, and 302) are communicatively coupled via a local interface 312. The local interface 312 can be, for example, but not limited to, one or more buses or other wired or wireless connections, as is known in the art. The local interface 312 can have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 can be any custom made or commercially available processor, a CPU, an auxiliary processor among several processors associated with the user device 300, a semiconductor-based microprocessor (in the form of a microchip or chipset), or generally any device for executing software instructions. When the user device 300 is in operation, the processor 302 is configured to execute software stored within the memory 310, to communicate data to and from the memory 310, and to generally control operations of the user device 300 pursuant to the software instructions. In an embodiment, the processor 302 may include a mobile optimized processor such as optimized for power consumption and mobile applications. The I/O interfaces 304 can be used to receive user input from and/or for providing system output. User input can be provided via, for example, a keypad, a touch screen, a scroll ball, a scroll bar, buttons, a barcode scanner, and the like. System output can be provided via a display device such as a Liquid Crystal Display (LCD), touch screen, and the like.

The network interface 306 enables wireless communication to an external access device or network. Any number of suitable wireless data communication protocols, techniques, or methodologies can be supported by the network interface 306, including any protocols for wireless communication. The data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media.

The memory 310 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 310 may incorporate electronic, magnetic, optical, and/or other types of storage media. Note that the memory 310 may have a distributed architecture, where various components are situated remotely from one another but can be accessed by the processor 302. The software in memory 310 can include one or more software programs, each of which includes an ordered listing of executable instructions for implementing logical functions. In the example of FIG. 3, the software in the memory 310 includes a suitable operating system 314 and programs 316. The operating system 314 essentially controls the execution of other computer programs and provides scheduling, input-output control, file and data management, memory management, and communication control and related services. The programs 316 may include various applications, add-ons, etc. configured to provide end user functionality with the user device 300. For example, example programs 316 may include, but not limited to, a web browser, social networking applications, streaming media applications, games, mapping and location applications, electronic mail applications, financial applications, and the like. In a typical example, the end-user typically uses one or more of the programs 316 along with a network such as the cloud-based system 100.

§ 5.0 Zero Trust Network Access Using the Cloud-Based System

Figure 6:
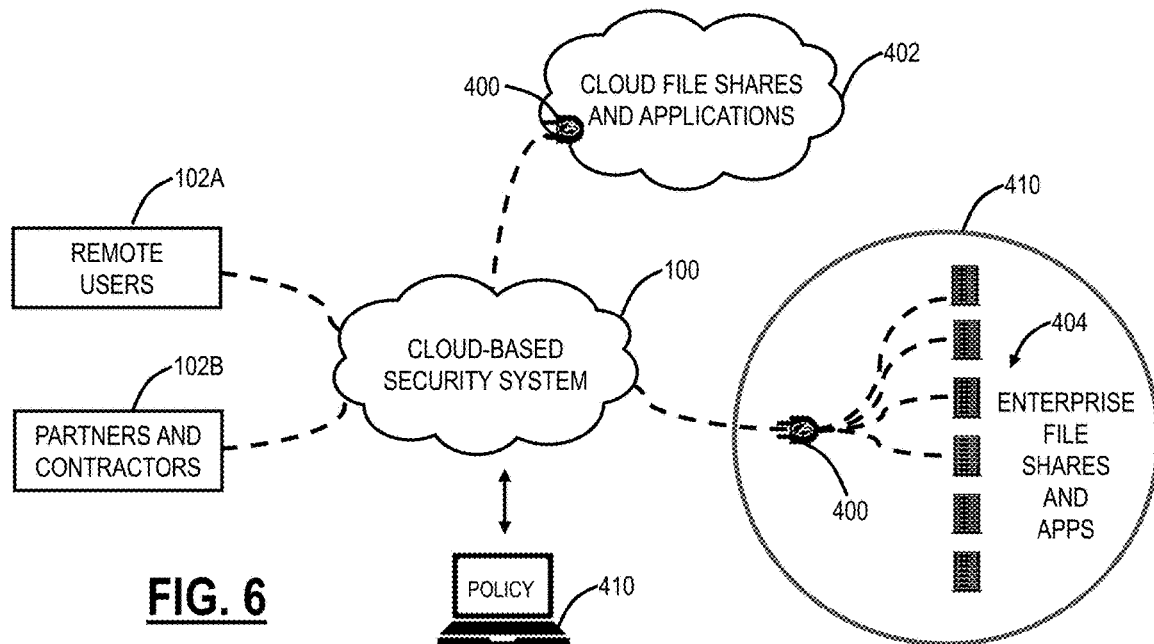
FIG. 6 is a network diagram of a Zero Trust Network Access (ZTNA) application utilizing the cloud-based system of FIGS. 1 and 2.

FIG. 6 is a network diagram of a Zero Trust Network Access (ZTNA) application utilizing the cloud-based system 100. For ZTNA, the cloud-based system 100 can dynamically create a connection through a secure tunnel between an endpoint (e.g., users 102A, 102B) that are remote and an on-premises connector 400 that is either located in cloud file shares and applications 402 and/or in an enterprise network 410 that includes enterprise file shares and applications 404. The connection between the cloud-based system 100 and on-premises connector 400 is dynamic, on-demand, and orchestrated by the cloud-based system 100. A key feature is its security at the edge—there is no need to punch any holes in the existing on-premises firewall. The connector 400 inside the enterprise (on-premises) "dials out" and connects to the cloud-based system 100 as if too were an endpoint. This on-demand dial-out capability and tunneling authenticated traffic back to the enterprise is a key differentiator for ZTNA. Also, this functionality can be implemented in part by the application 350 on the user device 300. Also, the applications 402, 404 can include B2B applications. Note, the difference between the applications 402, 404 is the applications 402 are hosted in the cloud, whereas the applications 404 are hosted on the enterprise network 410. The B2B service described herein contemplates use with either or both of the applications 402, 404.

The paradigm of virtual private access systems and methods is to give users network access to get to an application and/or file share, not to the entire network. If a user is not authorized to get the application, the user should not be able even to see that it exists, much less access it. The virtual private access systems and methods provide an approach to deliver secure access by decoupling applications 402, 404 from the network, instead of providing access with a connector 400, in front of the applications 402, 404, an application on the user device 300, a central authority 152 to push policy, and the cloud-based system 100 to stitch the applications 402, 404 and the software connectors 400 together, on a per-user, per-application basis.

With the virtual private access, users can only see the specific applications 402, 404 allowed by the central authority 152. Everything else is "invisible" or "dark" to them. Because the virtual private access separates the application from the network, the physical location of the application 402, 404 becomes irrelevant—if applications 402, 404 are located in more than one place, the user is automatically directed to the instance that will give them the best performance. The virtual private access also dramatically reduces configuration complexity, such as policies/firewalls in the data centers. Enterprises can, for example, move applications to Amazon Web Services or Microsoft Azure, and take advantage of the elasticity of the cloud, making private, internal applications behave just like the marketing leading enterprise applications. Advantageously, there is no hardware to buy or deploy because the virtual private access is a service offering to end-users and enterprises.

§ 6.0 Digital Experience Monitoring

Figure 7:
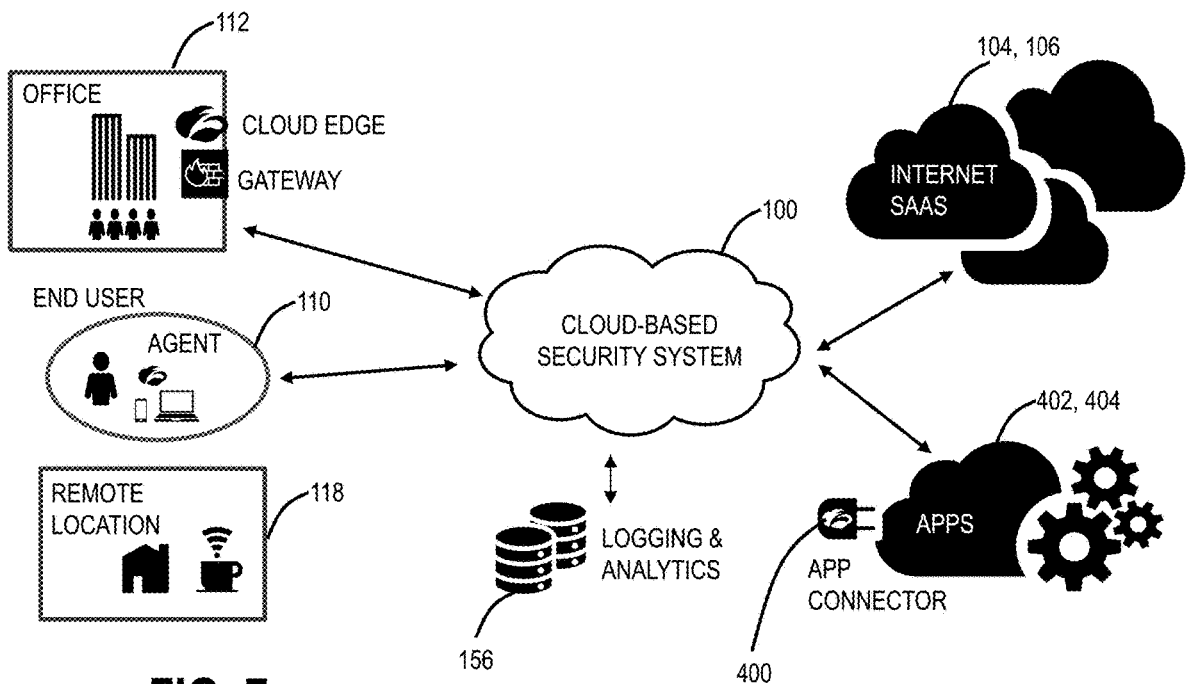
FIG. 7 is a network diagram of the cloud-based system of FIGS. 1 and 2 in an application of digital experience monitoring.

FIG. 7 is a network diagram of the cloud-based system 100 in an application of digital experience monitoring. Here, the cloud-based system 100 providing security as a service as well as ZTNA, can also be used to provide real-time, continuous digital experience monitoring, as opposed to conventional approaches (synthetic probes). A key aspect of the architecture of the cloud-based system 100 is the inline monitoring. This means data is accessible in real-time for individual users from end-to-end. As described herein, digital experience monitoring can include monitoring, analyzing, and improving the digital user experience.

The cloud-based system 100 connects users 102 at the locations 110, 112, 118 to the applications 402, 404, the Internet 104, the cloud services 106, etc. The inline, end-to-end visibility of all users enables digital experience monitoring. The cloud-based system 100 can monitor, diagnose, generate alerts, and perform remedial actions with respect to network endpoints, network components, network links, etc. The network endpoints can include servers, virtual machines, containers, storage systems, or anything with an IP address, including the Internet of Things (IoT), cloud, and wireless endpoints. With these components, these network endpoints can be monitored directly in combination with a network perspective. Thus, the cloud-based system 100 provides a unique architecture that can enable digital experience monitoring, network application monitoring, infrastructure component interactions, etc. Of note, these various monitoring aspects require no additional components—the cloud-based system 100 leverages the existing infrastructure to provide this service.

Again, digital experience monitoring includes the capture of data about how end-to-end application availability, latency, and quality appear to the end user from a network perspective. This is limited to the network traffic visibility and not within components, such as what application performance monitoring can accomplish. Networked application monitoring provides the speed and overall quality of networked application delivery to the user in support of key business activities. Infrastructure component interactions include a focus on infrastructure components as they interact via the network, as well as the network delivery of services or applications. This includes the ability to provide network path analytics.

The cloud-based system 100 can enable real-time performance and behaviors for troubleshooting in the current state of the environment, historical performance and behaviors to understand what occurred or what is trending over time, predictive behaviors by leveraging analytics technologies to distill and create actionable items from the large dataset collected across the various data sources, and the like. The cloud-based system 100 includes the ability to directly ingest any of the following data sources network device-generated health data, network device-generated traffic data, including flow-based data sources inclusive of NetFlow and IPFIX, raw network packet analysis to identify application types and performance characteristics, HTTP request metrics, etc. The cloud-based system 100 can operate at 10 gigabits (10G) Ethernet and higher at full line rate and support a rate of 100,000 or more flows per second or higher.

The applications 402, 404 can include enterprise applications, Office 365, Salesforce, Skype, Google apps, internal applications, etc. These are critical business applications where user experience is important. The objective here is to collect various data points so that user experience can be quantified for a particular user, at a particular time, for purposes of analyzing the experience as well as improving the experience. In an embodiment, the monitored data can be from different categories, including application-related, network-related, device-related (also can be referred to as endpoint-related), protocol-related, etc. Data can be collected at the application 350 or the cloud edge to quantify user experience for specific applications, i.e., the application-related and device-related data. The cloud-based system 100 can further collect the network-related and the protocol-related data (e.g., Domain Name System (DNS) response time).

Application-related data

| | |
|---|---|
| Page Load Time | Redirect count (#) |
| Page Response Time | Throughput (bps) |
| Document Object Model (DOM) Load Time | Total size (bytes) |
| Total Downloaded bytes | Page error count (#) |
| App availability (%) | Page element count by category (#) |

Network-related data

| | |
|---|---|
| HTTP Request metrics | Bandwidth |
| Server response time | Jitter |
| Ping packet loss (%) | Trace Route |
| Ping round trip | DNS lookup trace |
| Packet loss (%) | GRE/IPSec tunnel monitoring |
| Latency | MTU and bandwidth measurements |

Device-related data (endpoint-related data)

| | |
|---|---|
| System details | Network (config) |
| Central Processing Unit (CPU) | Disk |
| Memory (RAM) | Processes |
| Network (interfaces) | Applications |

Metrics could be combined. For example, device health can be based on a combination of CPU, memory, etc. Network health could be a combination of Wi-Fi/LAN connection health, latency, etc. Application health could be a combination of response time, page loads, etc. The cloud-based system 100 can generate service health as a combination of CPU, memory, and the load time of the service while processing a user's request. The network health could be based on the number of network path(s), latency, packet loss, etc.

The lightweight connector 400 can also generate similar metrics for the applications 402, 404. In an embodiment, the metrics can be collected while a user is accessing specific applications that user experience is desired for monitoring. In another embodiment, the metrics can be enriched by triggering synthetic measurements in the context of an in-line transaction by the application 350 or cloud edge. The metrics can be tagged with metadata (user, time, app, etc.) and sent to a logging and analytics service for aggregation, analysis, and reporting. Further, network administrators can get UEX reports from the cloud-based system 100. Due to the inline nature and the fact the cloud-based system 100 is an overlay (in-between users and services/applications), the cloud-based system 100 enables the ability to capture user experience metric data continuously and to log such data historically. As such, a network administrator can have a long-term detailed view of the network and associated user experience.

§ 7.0 Cloud Tunnel

Figure 8:
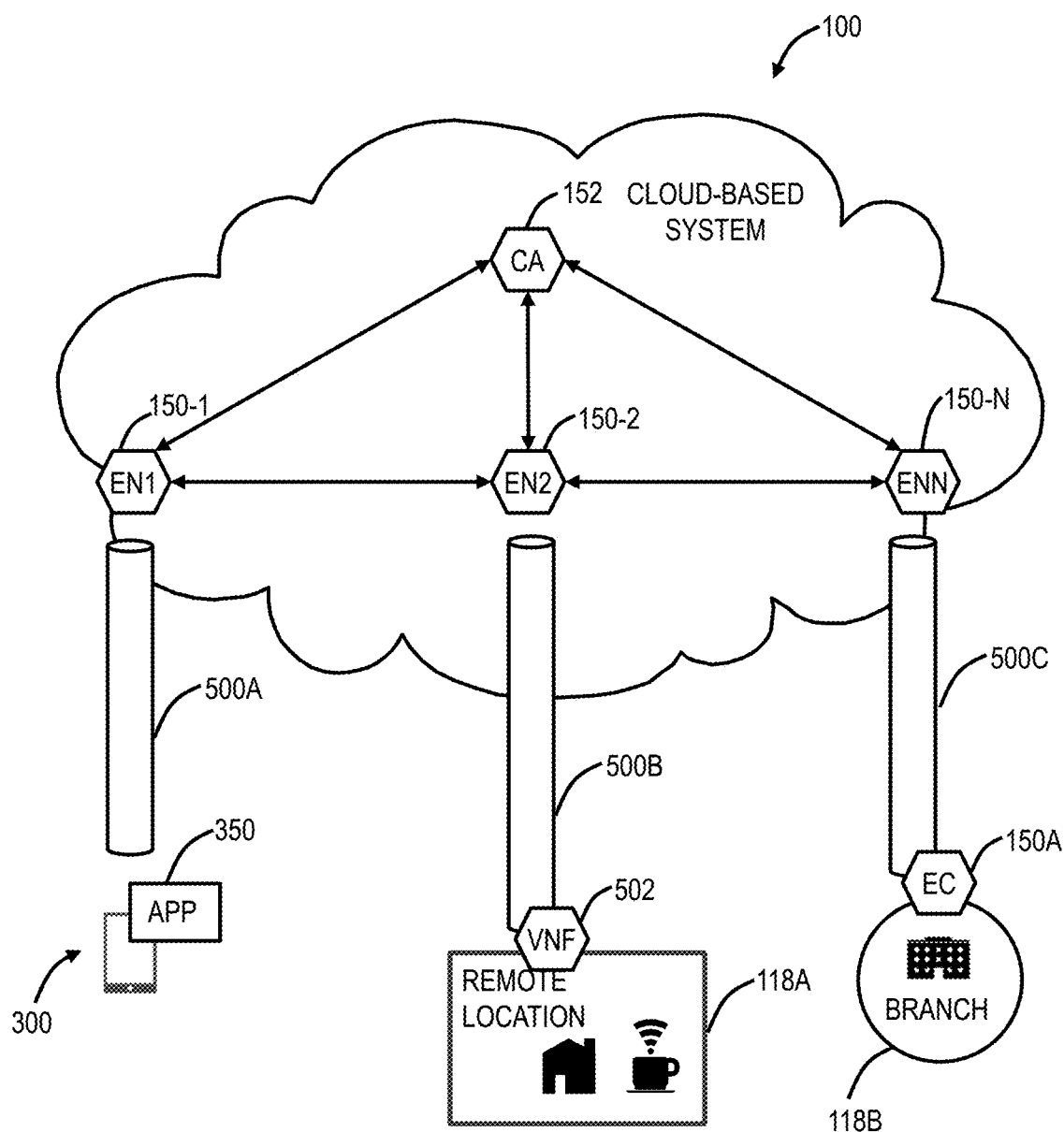
FIG. 8 is a network diagram of the cloud-based system of FIGS. 1 and 2 with various cloud tunnels, labeled as cloud tunnels, for forwarding traffic.
Figure 9:
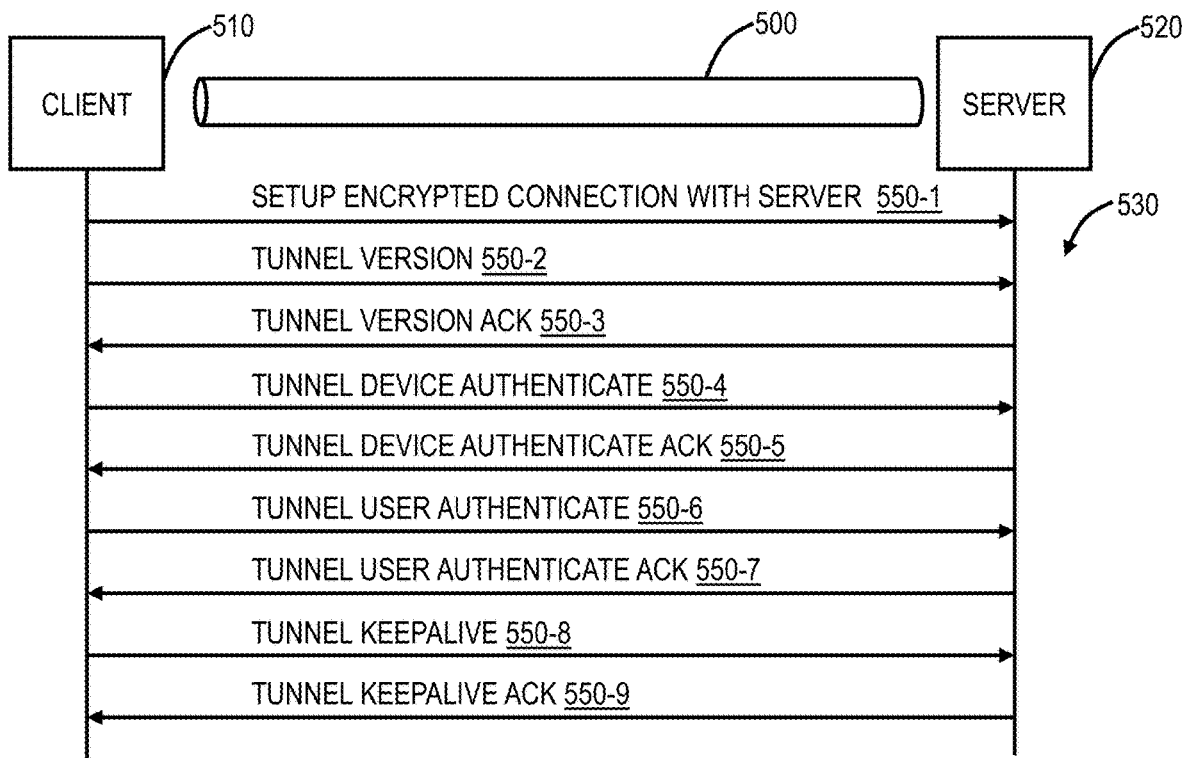
FIGS. 9 and 10 are flow diagrams of a cloud tunnel illustrating a control channel (FIG. 9) and a data channel (FIG. 10), with the tunnel illustrated between a client and a server.
Figure 10:
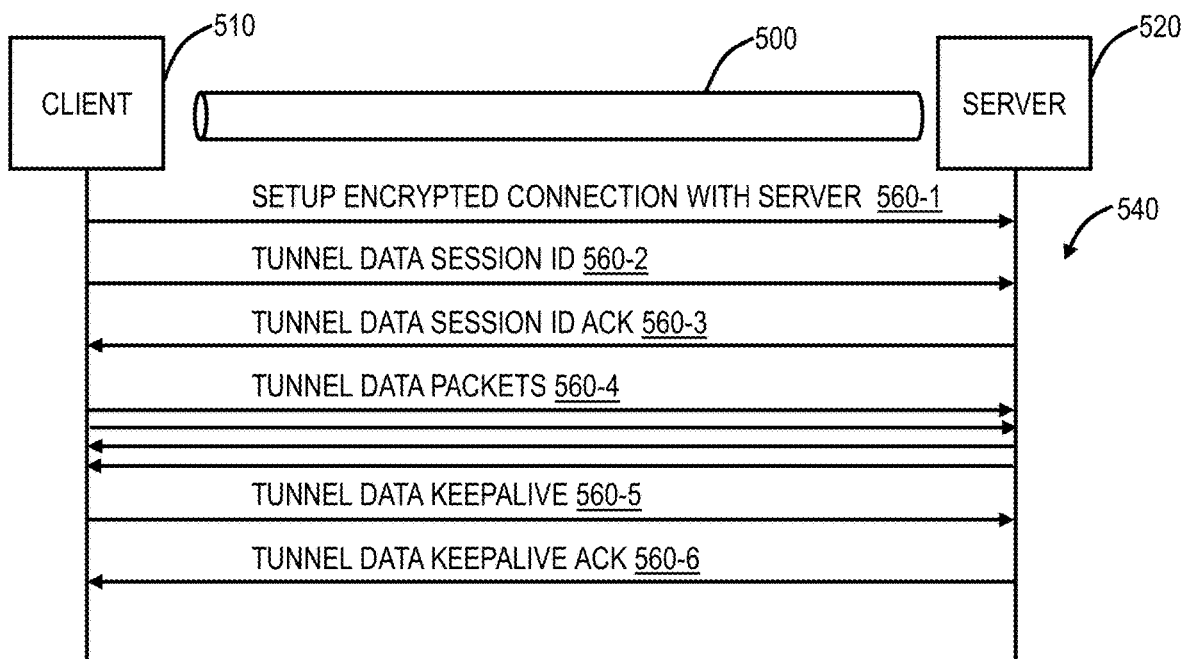

FIG. 8 is a network diagram of the cloud-based system 100 with various cloud tunnels 500, labeled as cloud tunnels 500A, 500B, 500C, for forwarding traffic. FIGS. 9 and 10 are flow diagrams of a cloud tunnel 500 illustrating a control channel (FIG. 9) and a data channel (FIG. 10), with the tunnel illustrated between a client 510 and a server 520. The cloud tunnel 500 is a lightweight tunnel that is configured to forward traffic between the client 510 and the server 520. The present disclosure focuses on the specific mechanisms used in the cloud tunnel 500 between two points, namely the client 510 and the server 520. Those skilled in the art will recognize the cloud tunnel 500 can be used with the cloud-based system 100 as an example use case, and other uses are contemplated. That is, the client 510 and the server 520 are just endpoint devices that support the exchange of data traffic and control traffic for tunnel 500. For description, the server 520 can be referred to as a local node and the client 510 as a remote node, where the tunnel operates between the local and remote nodes.

In an embodiment, the cloud-based system 100 can use the cloud tunnel 500 to forward traffic to the enforcement nodes 150, such as from a user device 300 with the application 350, from a branch office/remote location 118, etc. FIG. 8 illustrates three example use cases for the cloud tunnel 500 with the cloud-based system 100, and other uses are also contemplated. In a first use case, a cloud tunnel 500A is formed between a user device 300, such as with the application 350, and an enforcement node 150-1. For example, when a user 102 associated with the user device 300 connects to a network, the application 350 can establish the cloud tunnel 500A to the closest or best enforcement node 150-1 and forward the traffic through the cloud tunnel 500A so that the enforcement node 150-1 can apply the appropriate security and access policies. Here, the cloud tunnel 500A supports a single user 102, associated with the user device 300.

In a second use case, a cloud tunnel 500B is formed between a Virtual Network Function (VNF) 502 or some other device at a remote location 118A and an enforcement node 150-2. Here, the VNF 502 is used to forward traffic from any user 102 at the remote location 118A to the enforcement node 150-2. In a third use case, a cloud tunnel 110C is formed between an on-premises enforcement node, referred to as an Edge Connector (EC) 150A, and an enforcement node 150-N. The edge connector 150A can be located at a branch office 118A or the like. In some embodiments, the edge connector 150A can be an enforcement node 150 in the cloud-based system 100 but located on-premises with a tenant. Here, in the second and third use cases, the cloud tunnels 500B, 500C support multiple users 102.

There can be two versions of the cloud tunnel 500, referred to as tunnel 1 and tunnel 2. The tunnel 1 can only support Web protocols as an HTTP connect tunnel operating on a Transmission Control Protocol (TCP) stream. That is, tunnel 1 can send all proxy-aware traffic or port 80/443 traffic to the enforcement node 150, depending on the forwarding profile configuration. This can be performed via CONNECT requests, similar to a traditional proxy.

The tunnel 2 can support multiple ports and protocols, extending beyond only web protocols. As described herein, the cloud tunnels 500 are tunnel 2. In all of the use cases, the cloud tunnel 500 enables each user device 300 to redirect traffic destined to all ports and protocols to a corresponding enforcement node 150. Note, the cloud-based system 100 can include load balancing functionality to spread the cloud tunnels 500 from a single source IP address. The cloud tunnel 500 supports device logging for all traffic, firewall, etc., such as in the storage cluster 156. The cloud tunnel 500 utilizes encryption, such as via TLS or Datagram TLS (DTLS), to tunnel packets between the two points, namely the client 510 and the server 520. As described herein, the client 510 can be the user device 300, the VNF 502, and/or the edge connector 150A, and the server 520 can be the enforcement node 150. Again, other devices are contemplated with the cloud tunnel 500.

The cloud tunnel 500 can use a Network Address Translation (NAT) device that does not require a different egress IP for each device's 300 separate sessions. Again, the cloud tunnel 500 has a tunneling architecture that uses DTLS or TLS to send packets to the cloud-based system 100. Because of this, the cloud tunnel 500 is capable of sending traffic from all ports and protocols.

Thus, the cloud tunnel 500 provides complete protection for a single user 102, via the application 350, as well as for multiple users at remote locations 118, including multiple security functions such as cloud firewall, cloud IPS, etc. The cloud tunnel 500 includes user-level granularity of the traffic, enabling different users 102 on the same cloud tunnel 500 for the enforcement nodes 150 to provide user-based granular policy and visibility. In addition to user-level granularity, the cloud tunnel 500 can provide application-level granularity, such as by mapping mobile applications (e.g., Facebook, Gmail, etc.) to traffic, allowing for app-based granular policies.

FIGS. 9 and 10 illustrate the two communication channels, namely a control channel 530 and a data channel 540, between the client 510 and the server 520. Together, these two communication channels 530, 540 form the cloud tunnel 500. In an embodiment, the control channel 530 can be an encrypted TLS connection or SSL connection, and the control channel 530 is used for device and/or user authentication and other control messages. In an embodiment, the data channel 540 can be an encrypted DTLS or TLS connection, i.e., the data channel can be one or more DTLS or TLS connections for the transmit and receive of user IP packets. There can be multiple data channels 540 associated with the same control channel 530. The data channel 540 can be authenticated using a Session Identifier (ID) from the control channel 530.

Of note, the control channel 530 always uses TLS because some locations (e.g., the remote location 118A, the branch office 118B, other enterprises, hotspots, etc.) can block UDP port 443, preventing DTLS. Whereas TLS is widely used and not typically blocked. The data channel 540 preferably uses DTLS, if it is available, i.e., not blocked on the client 510. If it is blocked, the data channel 540 can use TLS instead. For example, DTLS is the primary protocol for the data channel 540 with TLS used as a fallback over TCP port 443 if DTLS is unavailable, namely if UDP port 443 is blocked at the client 510.

In FIG. 9, the control channel 530 is illustrated with exchanges between the client 510 and the server 520. Again, the control channel 530 includes TLS encryption, which is established through a setup or handshake between the client 510 and the server 520 (step 550-1). The client 510 can send its version of tunnel 500 to the server 520 (step 550-2) to which the server 520 can acknowledge (step 550-3). For example, the version of the tunnel can include a simple version number or other indication, as well as an indication of whether the client 510 supports DTLS for the data channel 540. Again, the control channel 530 is fixed with TLS or SSL, but the data channel 540 can be either DTLS or TLS.

The client 510 can perform device authentication (step 550-4), and the server 520 can acknowledge the device authentication (step 550-5). The client 510 can perform user authentication (step 550-6), and the server 520 can acknowledge the user authentication (step 550-7). Note, the device authentication includes authenticating the user device 300, such as via the application 350, the VNF 502, the edge connector 150A, etc. The user authentication includes authenticating the users 102 associated with the user devices 300. Note, in an embodiment, the client 510 is the sole device 300, and here the user authentication can be for the user 102 associated with the client 510, and the device authentication can be for the user device 300 with the application 350. In another embodiment, the client 510 can have multiple user devices 300 and corresponding users 102 associated with it. Here, the device authentication can be for the VNF 502, the edge connector 150A, etc., and the user authentication can be for each user device 300 and corresponding user 102, and the client 510 and the server 520 can have a unique identifier for each user device 300, for user-level identification.

The device authentication acknowledgment can include a session identifier (ID) that is used to bind the control channel 530 with one or more data channels 540. The user authentication can be based on a user identifier (ID) that is unique to each user 102. The client 510 can periodically provide keep alive packets (step 550-8), and the server 520 can respond with keep alive acknowledgment packets (step 550-9). The client 510 and the server 520 can use the keep alive packets or messages to maintain the control channel 530. Also, the client 510 and the server 520 can exchange other relevant data over the control channel 530, such as metadata, which identifies an application for a user 102, location information for a user device 300, etc.

In FIG. 10, similar to FIG. 9, the data channel 540 is illustrated with exchanges between the client 510 and the server 520. Again, the data channel 540 includes TLS or DTLS encryption, which is established through a setup or handshake between the client 510 and the server 520 (step 560-1). An example of a handshake is illustrated in FIG. 11. Note, the determination of whether to use TLS or DTLS is based on the session ID, which is part of the device authentication acknowledgment, and which is provided over the data channel 540 (steps 560-2, 560-3). Here, the client 510 has told the server 520 its capabilities, and the session ID reflects what the server 520 has chosen, namely TLS or DTLS, based on the client's 510 capabilities. In an embodiment, the server 520 chooses DTLS if the client 510 supports it, i.e., if UDP port 443 is not blocked, otherwise the server 520 chooses TLS. Accordingly, the control channel 530 is established before the data channel 540. The data channel 540 can be authenticated based on the session ID from the control channel 530.

The data channel 540 includes the exchange of data packets between the client 510 and the server 520 (step 560-4). The data packets include an identifier such as the session ID and a user ID for the associated user 102.

Additionally, the data channel 540 can include "keep alive" packets between the client 510 and the server 520 (steps 560-5, 560-6).

The cloud tunnel 500 can support load balancing functionality between the client 510 and the server 520. The server 520 can be in a cluster, i.e., multiple servers 200. For example, the server 520 can be an enforcement node 150 cluster in the cloud-based system 100. Because there can be multiple data channels 540 for a single control channel 530, it is possible to have the multiple data channels 540, in a single cloud tunnel 500, connected to different physical servers 200 in a cluster. Thus, the cloud-based system 100 can include load balancing functionality to spread the cloud tunnels 500 from a single source IP address, i.e., the client 510.

Also, the use of DTLS for the data channels 540 allows the user devices 300 to switch networks without potentially impacting the traffic going through tunnel 500. For example, a large file download could continue uninterrupted when a user device 300 moves from Wi-Fi to mobile, etc. Here, the application 350 can add some proprietary data to the DTLS client-hello server name extension. That proprietary data helps a load balancer balance the new DTLS connection to the same server 200 in a cluster where the connection prior to network change was being processed. So, a newly established DTLS connection with a different IP address (due to network change) can be used to tunnel packets of the large file download that was started before the network change. Also, some mobile carriers use different IP addresses for TCP/TLS (control channel) and UDP/DTLS (data channel) flows. The data in DTLS client-hello helps the load balancer balance the control and data connection to the same server 200 in the cluster.

§ 8.0 Cloud Connectivity

FIG. 11 is a diagram illustrating various techniques to forward traffic to the cloud-based system 100. These include, for example, use of the application 350 as a client connector for forwarding traffic, use of the connector 400 app, use of the VNF 502 or some other device, use of the edge connector 150A, and use of an eSIM/iSIM/SIM-card 600. The application 350 can be referred to as a client connector and it is via a native application executed on the user device 300 as well as being user ID-based. The connector 400 can be referred to as an app connector. The edge connector 150A can be referred to as a private service edge.

There is a requirement to get any customer traffic to/from the cloud-based system 100. However, there is a gap on some devices. The current approach, e.g., with the application 350, the connector 400, etc. there is a reliance on the device, namely installation of a forwarding app, a reliance on an operating system, namely virtual interfaces, and a reliance on forwarding gateways, namely the edge connector 150A. However, these may not be available with other types of devices such as IoT devices and the like. As described herein, the present disclosure utilizes the term client device to include, without limitations IoT devices (e.g., smart scooters, etc.), Operational Technology (OT) platforms (e.g., Supervisory Control and Data Acquisition (SCADA) systems, Industrial Control Systems (ICS), etc.), medical equipment (e.g., CAT and MRI scanners, etc.), connected vehicles, and practically any device that has a Subscriber Identification Module (SIM) in the form of a card, an eSIM, or an iSIM. Those skilled in the art will recognize that a client device differs from the user device 300 as it may not have the ability to implement the application 350, not support a user ID for identifying the user 102, etc.

The present disclosure includes two additional techniques for cloud connectivity for IoT devices including an eSIM/iSIM/SIM-card 600 based approach and a cloud/branch/thing connector 604. The ESIM/iSIM/SIM-card 600 based approach can be referred to as a device connector. The ESIM/iSIM/SIM-card 600 based approach is used for forwarding traffic from any SIM-based device (e.g., 2G to 5G and beyond). The key here is identity is based on the ESIM/iSIM/SIM-card 600, namely the International Mobile Equipment Identity (IMEI), as opposed to a user ID. There is no need for a SDK implemented by the third-party manufacturers, thereby bypassing development and patching processes. The eSIM/iSIM/SIM-card 600 approach provides its own network path and connectivity to the cloud-based system 100 as illustrated in FIG. 12; no gateway is needed, and it is a plug and play approach.

The eSIM/iSIM/SIM-card 600 approach leverages the fact that eSIM/iSIM/SIM-card 600 can have compute capabilities and the ability to implement functions including encryption. A TLS tunnel or the like is established from the eSIM/iSIM/SIM-card 600 to the cloud-based system 100. For example, this can include development via JavaCard which is a software technology that allows Java-based applications (applets) to be run securely on smart cards and similar small memory footprint devices, such as the eSIM/iSIM/SIM-card 600 which has low power and memory. Advantageously, this approach requires no reliance on the device and the forwarding is from the eSIM/iSIM/SIM-card 600. Thus, this approach can work across various platforms, namely any device that uses the eSIM/iSIM/SIM-card 600. The eSIM/iSIM/SIM-card 600 approach can also be implemented with a global Mobile Virtual Network Operator (MVNO)/Roaming agreement.

The cloud/branch/thing connector 604 can use the VNF 502 as well and includes forwarding of server traffic and is implemented on a hardware device connected to a network. The cloud/branch/thing connector 604 can be used in an Application-aware Networking (APN) approach with a mobile network 650 as illustrated in FIG. 13. This approach leverages an APN as a gateway for traffic to forward to the cloud-based system 100. This, similar to the eSIM/iSIM/SIM-card 600 approach, can be used on any Mobile Network Operator (MNO) network.

§ 9.0 APN

Figure 14:
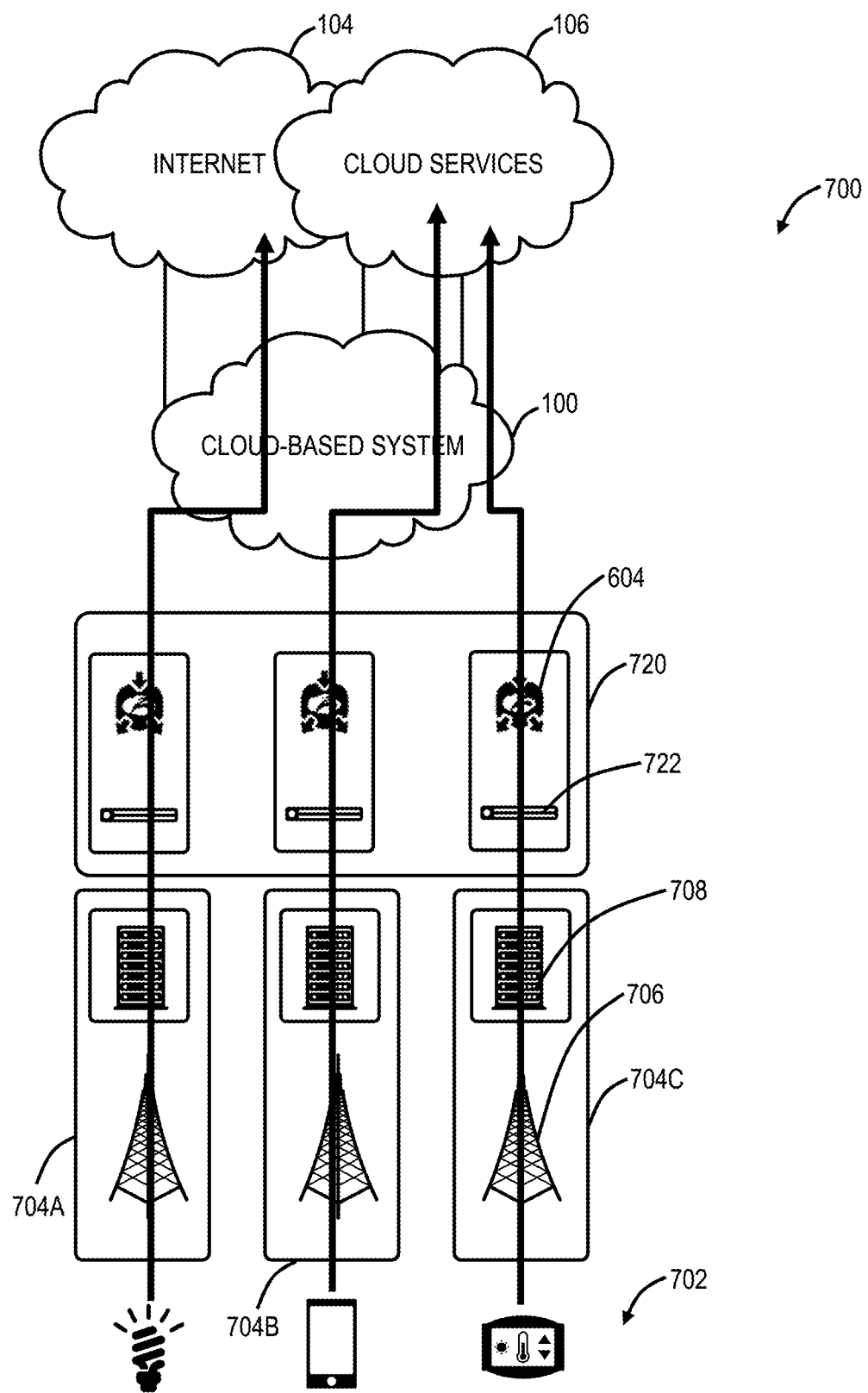
FIG. 14 is a network diagram of an APN network for traffic forwarding of IoT devices to the cloud-based system, such as for secure access to the Internet, to cloud services, etc.

FIG. 14 is a network diagram of an APN network 700 for traffic forwarding of IoT devices 702 to the cloud-based system 100, such as for secure access to the Internet 104, to cloud services 106, etc. Of note, the APN network 700 is illustrated with the client devices 702, but it could work with any type of user device 300. The client devices 702 are provisioned to operate on the APN network 700 with the eSIM/iSIM/SIM-card 600 as the ID. Traffic is passed from the local radio network to the carrier core, transparent to end client device 702.

The APN 700 is illustrated with three example Mobile Network Operators (MNOs) 704A, 704B, 704C, e.g., AT&T, Verizon, T-Mobile, etc. As is known in the art, MNOs 704 include radios 706 for wireless connectivity and servers 708 for processing. The MNOs 704 provide radio infrastructure, can include roaming agreements, and contract agreements with a Mobile Virtual Network Operator (MVNO) 720.

The APN network 700 includes the MVNO 720 which is a wireless communications services provider that does not own the wireless network infrastructure over which it provides services to its customers. The MVNO 720 enters into a business agreement with the MNOs 704 to obtain bulk access to network services at wholesale rates, then sets retail prices independently. The MVNO 720 may use its own customer service, billing support systems, marketing, and sales personnel, or it could employ the services of a Mobile Virtual Network Enabler (MVNE). The present disclosure utilizes the known concept of the MVNO 720 to forward traffic to the cloud-based system 100. The MVNO 720 can include servers 722 and the cloud/branch/thing connector 604 for connectivity to the cloud-based system 100.

Figure 15:
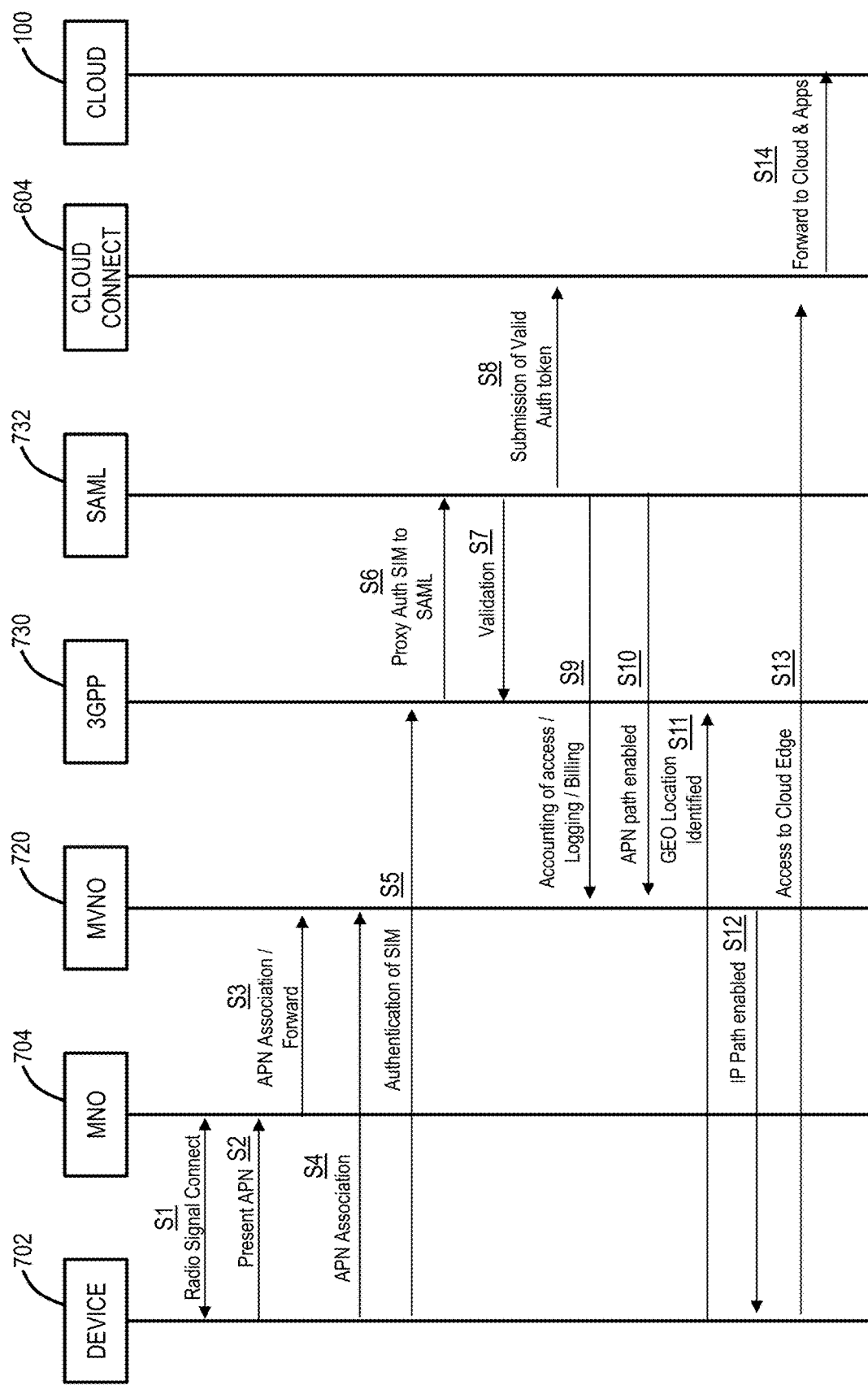
FIG. 15 is a flow diagram of communication in the APN network.

FIG. 15 is a flow diagram of communication in the APN network 700. FIG. 15 includes interactions between the client device 702, the MNO 704, the MVNO 720, a 3rd Generation Partnership Project (3GPP) 730 service, a Security Assertion Markup Language (SAML) 732 service, the cloud/branch/thing connector 604, and the cloud-based system 100. The device 702 connects via radio signals to the MNO 704 (step S1) and presents its configuration in the APN (step S2). The MNO 704 provides the APN association and forwarding to the MVNO 720 (step S3) and the device 702 is associated with the APN (step S4). The device 702's ESIM/iSIM/SIM-card 600 is authenticated using the 3GPP 730 services (step S5) which uses a proxy authentication of the ESIM/iSIM/SIM-card 600 to the SAML 732 service (step S6) which provides validation (step S7) and submission of a valid authentication token to the cloud connector 604 (step S8).

The SAML service 732 can provide accounting of access/logging/billing information to the MVNO 720 (step S9) and enable a path to the MVNO 720 (step S10). The device 702 has geolocation enabled as well through the 3GPP 730 services (step S11) and an IP path is enabled to the MVNO 720 (step S12). The device 702 now has access to the cloud edge via the MVNO 720 (step S13) and the cloud connector 602 forwards traffic to the cloud and applications (step S14).

Advantageously, the APN network 700 enables cloud connectivity for any ESIM/iSIM/SIM-card 600 connected device, including the client devices 702, the user devices 300, etc. All traffic from any device that is enrolled in the APN network 700 can be forwarded to the cloud-based system 100, with traffic forward from the MNO 704 to the MVNO 720 to the cloud connector 604 to the cloud-based system 100. The APN network 700 also removes the need for a client such as the application 350 or an SDK, as well as removing the need for physical network connections or gateways, just ride the APN network 700 to the cloud-based system 100. This removes the barrier to entry—no software to manage at the client level, no patching, etc. Existing providers connect devices through the APN network 700 to a firewall and then on to the Internet. The firewall is used to isolate the devices on APN—no security layer. In an embodiment, this allows the client devices 702 to obtain security services from the cloud-based system 100.

§ 10.0 ESIM/iSIM/SIM-card

Figure 16:
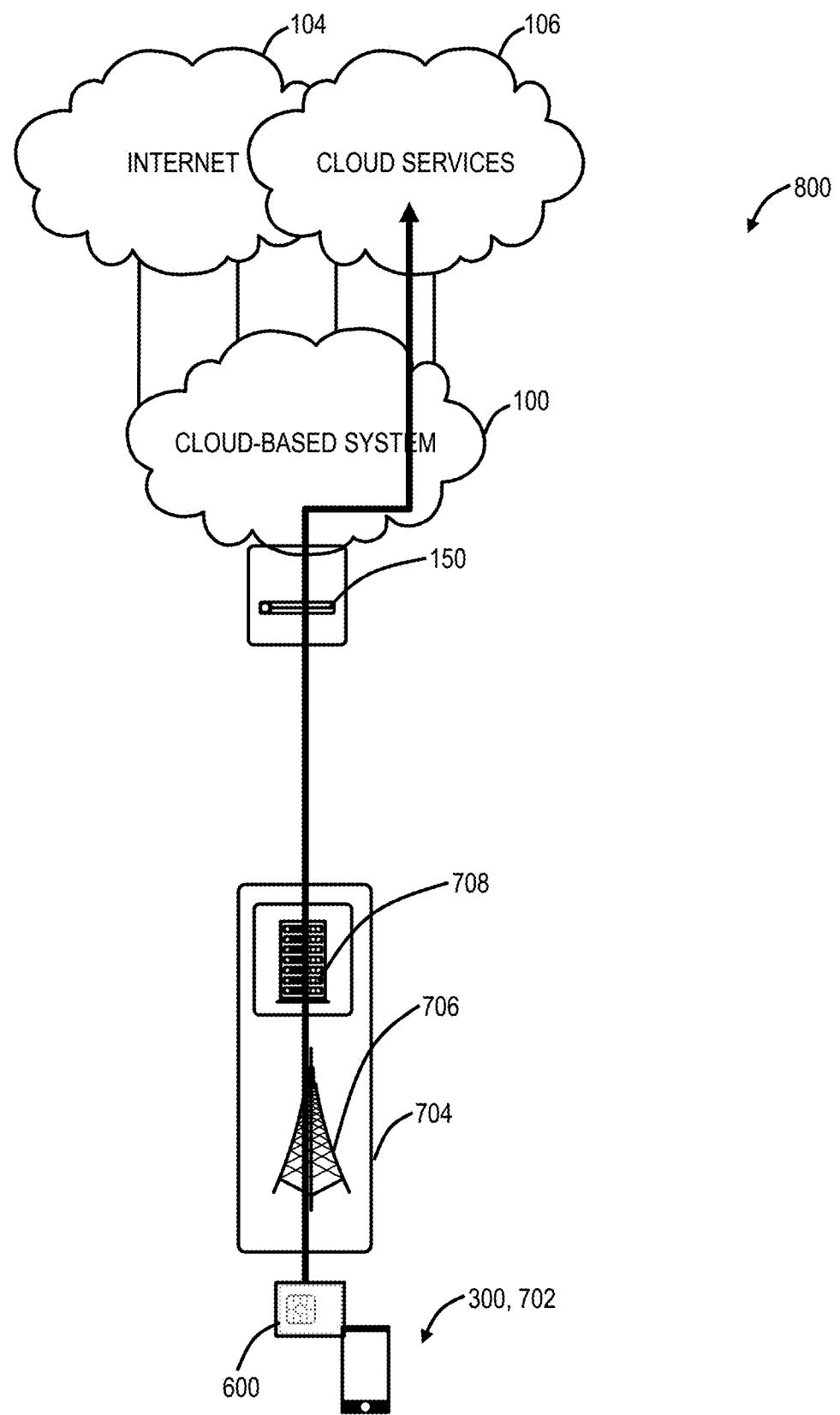
FIG. 16 is a network diagram of a network for traffic forwarding of any device having an ESIM/iSIM/SIM-card, embedded SIM (eSIM), integrated SIM (iSIM) or other SIM functions to the cloud-based system, such as for secure access to the Internet, to cloud services.

FIG. 16 is a network diagram of a network 800 for traffic forwarding of any device having an ESIM/iSIM/SIM-card 600 to the cloud-based system 100, such as for secure access to the Internet 104, to cloud services 106, etc. Of note, this approach can work with any device 300, 702 having a ESIM/iSIM/SIM-card 600. The devices 300, 702 are provisioned to operate on the MNO 700 with the ESIM/iSIM/SIM-card 600 as the ID. This approach leverages the fact that ESIM/iSIM/SIM-cards 600 have the capability to execute code, such as using JavaCard, so that a tunnel is created between the ESIM/iSIM/SIM-card 600 and the cloud-based system 100.

The ESIM/iSIM/SIM-card 600 is provisioned in advance with the functionality to support the cloud-based system 100. The ESIM/iSIM/SIM-card 600 can launch TCP/IP functionality including a tunnel to the cloud-based system 100, e.g., the cloud tunnel 500, a TLS tunnel, or any other type of tunnel with encryption. The MNO 704 validates the device 300, 702 and this can include SIM exceptions/authentication for known ESIM/iSIM/SIM-cards 600 supporting the tunnel to the cloud-based system 100. This can include agreements between the MNO 704 and the cloud-based system 100. Here, the cloud-based system 100 can provide details of allowable ESIM/iSIM/SIM-cards 600 to the MNO 704. The cloud-based system 100 can provide an ingress point for the tunnel from the ESIM/iSIM/SIM-card 600 and validate the ID based on the ESIM/iSIM/SIM-card 600 ID (IMEI). In this approach, the ESIM/iSIM/SIM-card 600 is the client 510 and the enforcement node 150 can be the server 520 in the tunnel 500.

Figure 17:
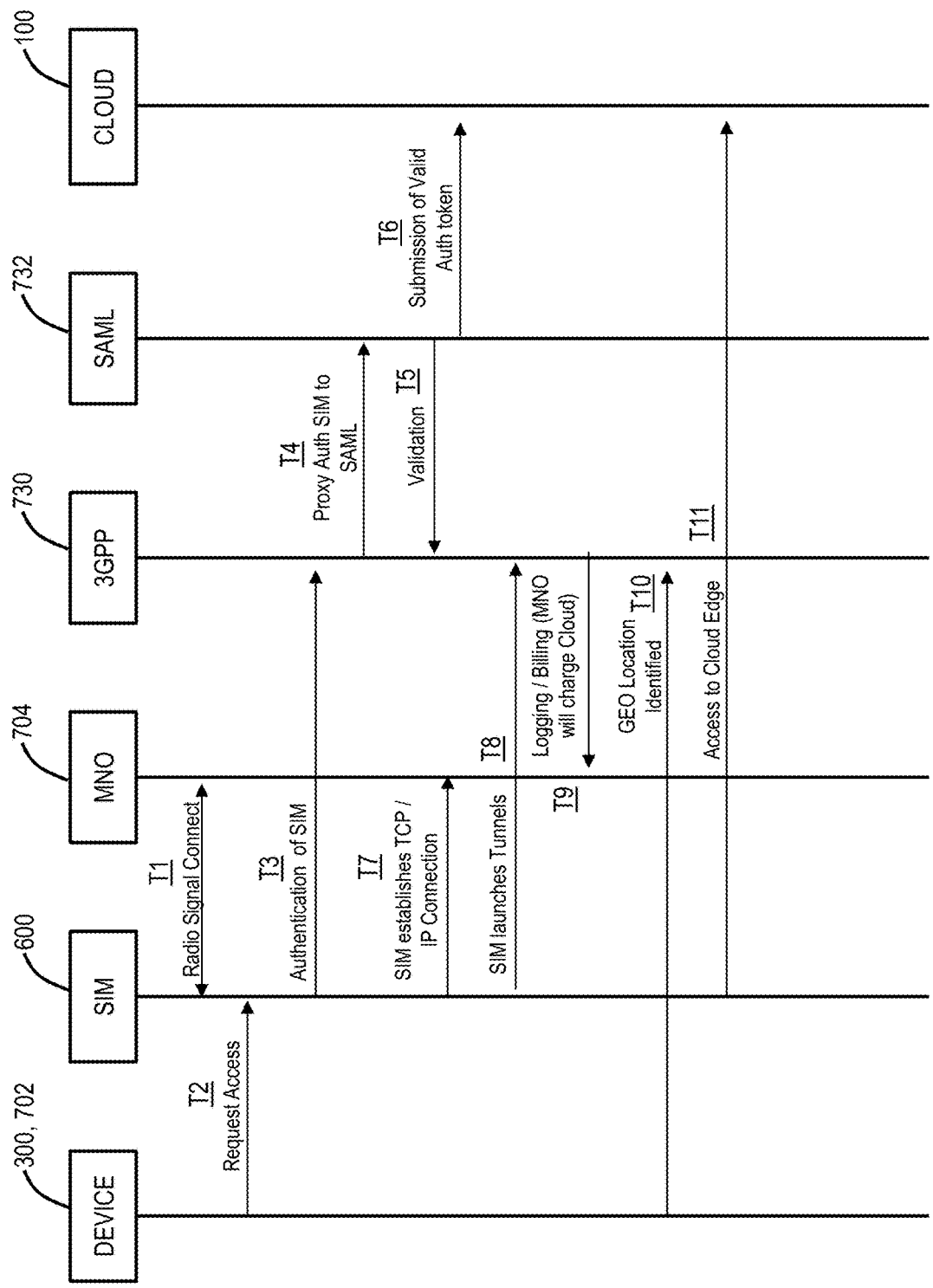
FIG. 17 is a flow diagram of communication in the ESIM/iSIM/SIM-card (or eSIM or iSIM) forwarding approach.

FIG. 17 is a flow diagram of communication in the ESIM/iSIM/SIM-card 600 forwarding approach. FIG. 17 includes similar components as in FIG. 15 except the connector 604 and the MVNO 720. Specifically, FIG. 17 includes the device 300, 702, the ESIM/iSIM/SIM-card 600 in the device 300, 702, the MNO 704, the 3GPP 730, the SAML 732, and the cloud-based system 100.

The ESIM/iSIM/SIM-card 600 allows the device 300, 702 to connect via radio signals to the MNO 704 (step T1), the device 300, 702 requests access via the ESIM/iSIM/SIM-card 600 (step T2), and the ESIM/iSIM/SIM-card 600 is authenticated through the 3GPP 730 (step T3). The 3GPP 730 can perform proxy authentication of the ESIM/iSIM/SIM-card 600 via the SAML 732 (step T4) which can validate (step T5) and provide a valid authentication token to the cloud-based system (step T6).

The ESIM/iSIM/SIM-card 600 is configured to establish a TCP/IP connection to the MNO 704 (step T7) and the ESIM/iSIM/SIM-card 600 launches a tunnel (step T8). Using the 3GPP 730 can provide logging and billing information to the MNO 704 (step T9) so that the cloud-based system 100 can be charged and the 3GPP 730 can determine the geo location of the device 300, 702 (step T10). Once complete, the device 300, 702 has access to the cloud-based system 100 based on a tunnel between the ESIM/iSIM/SIM-card 600 and the cloud-based system 100 (step T11).

Advantageously, the ESIM/iSIM/SIM-card 600 based approach supports secure forwarding from the ESIM/iSIM/SIM-card 600, including physical ESIM/iSIM/SIM-cards, embedded ESIM/iSIM/SIM-cards (ESIM) and IP Multimedia Services Identity Module (ISIM). The ESIM/iSIM/SIM-card 600 is pre-enrolled and all traffic from such devices 300, 702 having these ESIM/iSIM/SIM-cards 600 is forwarded to the cloud-based system 100. This also removes the need for the application 350 or an SDK, as well as does not require physical network connections, i.e., the MVNO 720. The identity of the device 300, 702 is based on the ESIM/iSIM/SIM-card 600. This ESIM/iSIM/SIM-card 600 based approach is ideal for IoT devices having a tunnel running in a small form factor.

§ 11.0 Device Forwarding Process

Figure 18:
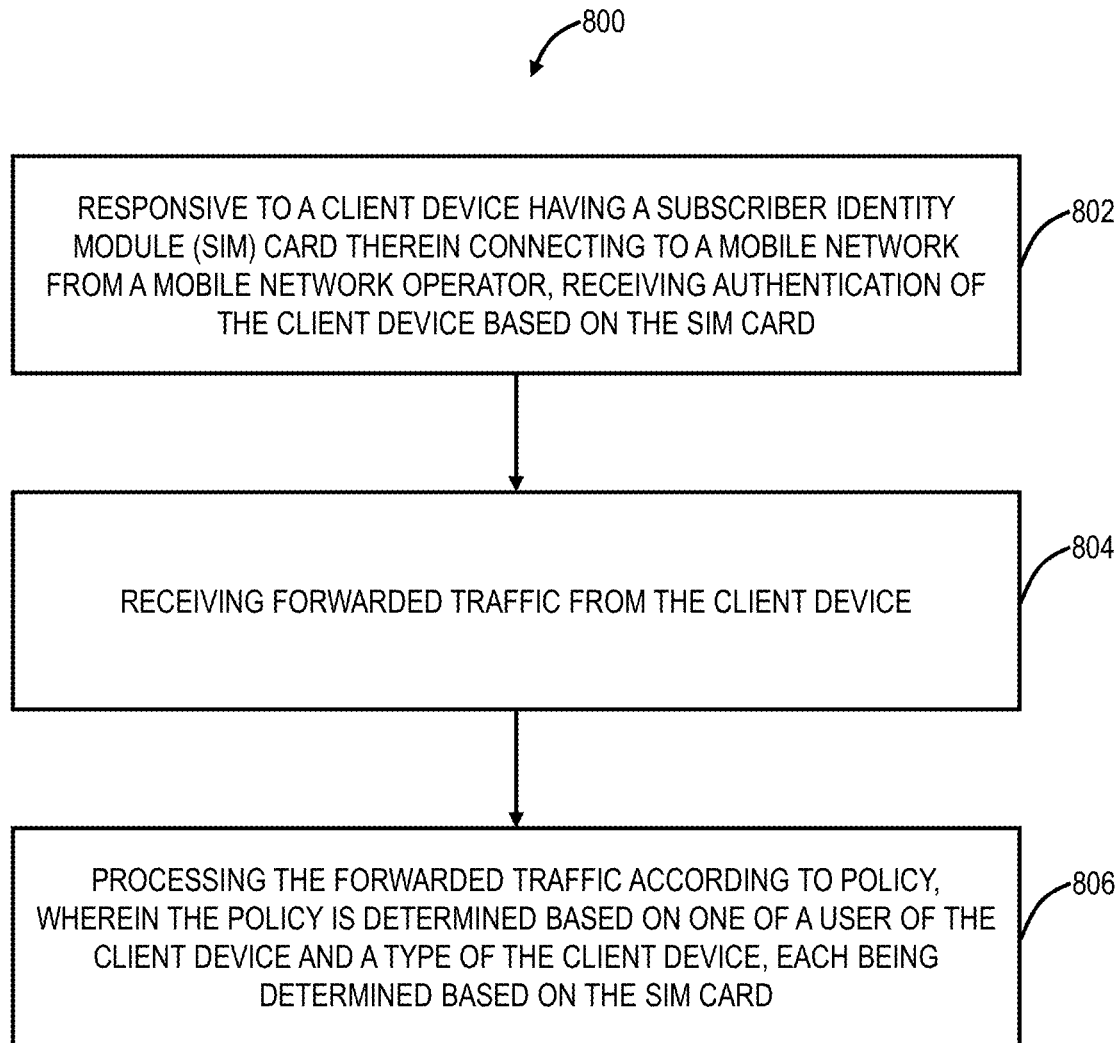
FIG. 18 is a flowchart of a process for forwarding traffic to the cloud-based system using an ESIM/iSIM/SIM-card (or eSIM or iSIM).

FIG. 18 is a flowchart of a process 800 for forwarding traffic to the cloud-based system using a ESIM/iSIM/SIM-card. The process 800 includes, responsive to a client device having a Subscriber Identity Module (SIM) card therein connecting to a mobile network from a mobile network operator, receiving authentication of the client device based on the ESIM/iSIM/SIM-card (step 802); receiving forwarded traffic from the client device (step 804); and processing the forwarded traffic according to policy, wherein the policy is determined based on one of a user of the client device and a type of the client device, each being determined based on the ESIM/iSIM/SIM-card (step 806).

The client device can be an Internet of Things (IoT) device. An identity of the user can be determined based on an International Mobile Equipment Identity (IMEI) of the ESIM/iSIM/SIM-card. The ESIM/iSIM/SIM-card can be preprogrammed for access to the cloud-based system. The ESIM/iSIM/SIM-card can be configured to implement a secure tunnel from the ESIM/iSIM/SIM-card to the cloud-based system. The eSIM/iSIM/SIM-card can execute JavaCard code for implementation of the secure tunnel. The secure tunnel can utilize any of Transport Layer Security (TLS), Secure Sockets Layer (SSL), and Datagram TLS (DTLS). The forwarded traffic can be forwarded over an Application-aware Networking (APN) network.

§ 12.0 Cloud-Based System Functions

Figure 19:
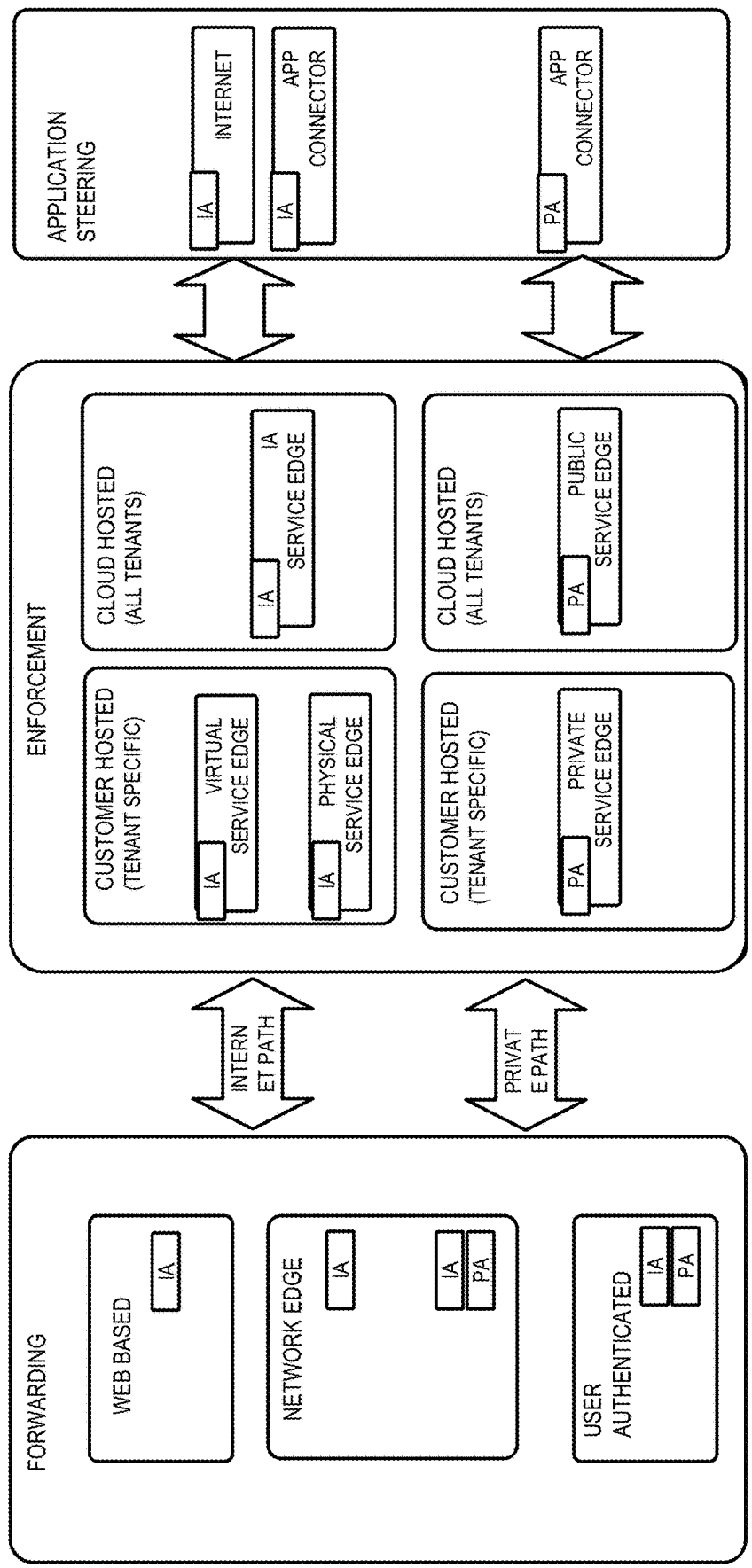
FIG. 19 is a block diagram illustrating functions of the cloud-based system.

FIG. 19 is a block diagram illustrating functions of the cloud-based system 100, for example, cloud-based services of Internet Access (IA) and Private application Access (PA). Of course, the cloud-based system 100 can offer any cloud service, and IA and PA are shown for illustration purposes. Logically, the cloud-based system 100 can have forwarding functions, enforcement functions, and application steering functions. The users 102 can be web-based, connecting to the cloud-based system via a PAC file or the like. The users 102 can be tunneled to the cloud-based system 100 via a network edge, or connect to the cloud-based system 100 via the network edge through the VNF 502 or the edge connector 150A. Finally, the users 102 can be authenticated and connected via the application 350. The enforcement functions are performed via the nodes 150, including virtual service edges, physical service edges, etc. The nodes 150 can be customer-hosted (tenant specific) or cloud-hosted (multi-tenant).

§ 13.0 Network Edge Options

In an embodiment, the present disclosure includes hosting a node 150 in a service provider's MEC, and this node 150 can be referred to as a virtual service edge. Note, the node 150 itself can be physical devices and/or virtual devices. The term "virtual service edge" is used to note this node is part of the cloud-based system 100 but located in the MEC of the service provider's network. In this approach, the virtual service edge is configured to provide edge hosted enforcement. This includes policy enforcement for all service provider customers as well as individual policy enforcement for authenticated customers. That is, the service provider can provide the cloud-based security to all of its customers, as well as to enterprise users who already have defined policies.

The Radio Access Network (RAN) sends client traffic direct to the Virtual Service Edge (VSE) which is hosted in the MEC, and the VSE processes traffic locally in the MEC. A Multi-Access Edge Compute (MEC), also known as Mobile edge computing (MEC), is an ETSI-defined network architecture that defines cloud computing capabilities at the edge of any network, i.e., a cellular network. The MEC is designed to be implemented as cellular based stations or other edge nodes.

In another embodiment, the present disclosure includes hosting a connector application, called a cloud connector, such as the VNF 502, the edge connector 150A, etc., in the MEC. The cloud connector is configured to forward traffic to the cloud-based system 100. The RAN sends client traffic directly to the cloud connector, the cloud connector is hosted in the MEC and considered a gateway for all traffic on the RAN.

Figure 20:
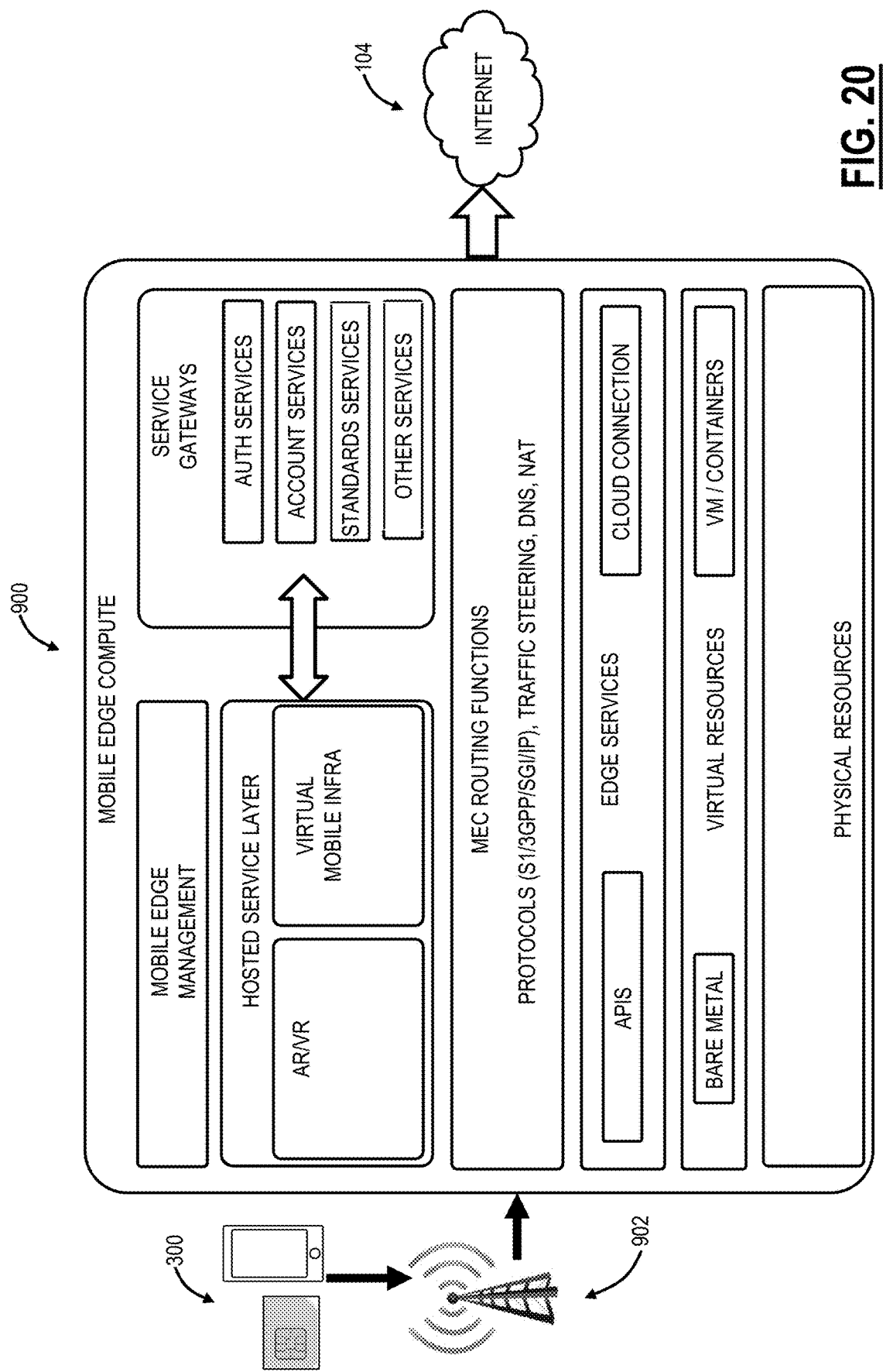
FIG. 20 is a block diagram of a MEC located at a base station of a service provider's network.

FIG. 20 is a block diagram of a MEC 900 located at a base station 902 of a service provider's network. FIG. 20 is a logical diagram of functions associated with the MEC 900. The MEC 900 is configured to enable user devices 300 to wirelessly connect to the Internet 104 via the base station 902. The MEC 900 includes physical resources, i.e., compute infrastructure, such as the servers 200. The MEC 900 can include virtual resources, such as Virtual Machines (VM), containers, bare metal, etc. On top of the resources are edge services, such as APIs, cloud connections, etc. The MEC 900 includes routing functions based on various protocols, traffic steering, DNS, Network Address Translation (NAT), etc. Next, the MEC 900 includes a hosted service layer and service gateways for various services—authentication, account, standards, etc. Finally, the MEC 900 includes mobile edge management.

Figure 21:
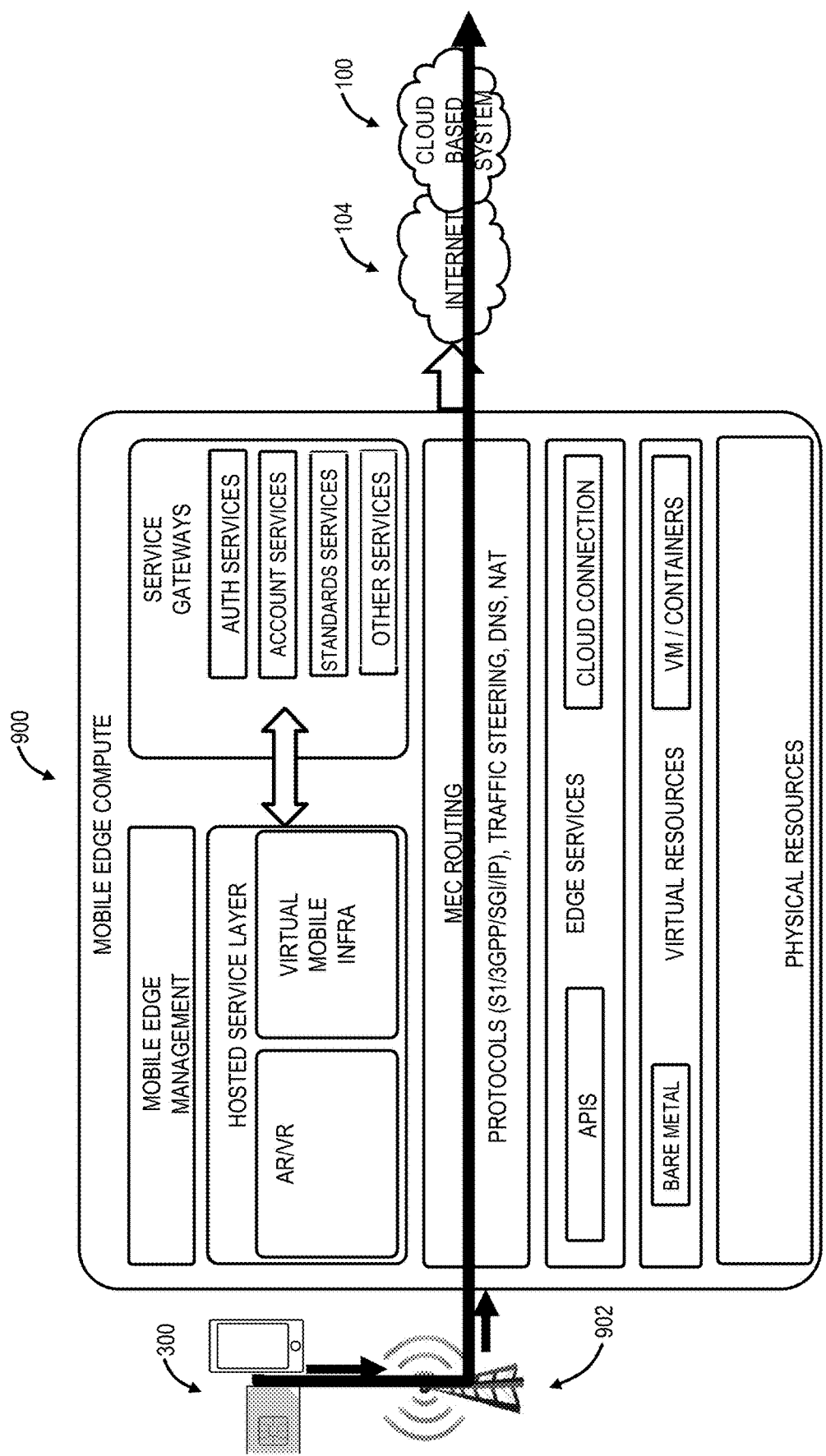
FIG. 21 is a block diagram of the MEC and the conventional approach with the cloud-based system.

FIG. 21 is a block diagram of the MEC 900 and the conventional approach with the cloud-based system 100. Conventionally, the MEC 900 forwards user traffic via the Internet 104 to the cloud-based system 100. Here, the MEC 900 is simply a pipe forwarding traffic, and the service provider is not offering the services of the cloud-based system 100.

Figure 22:
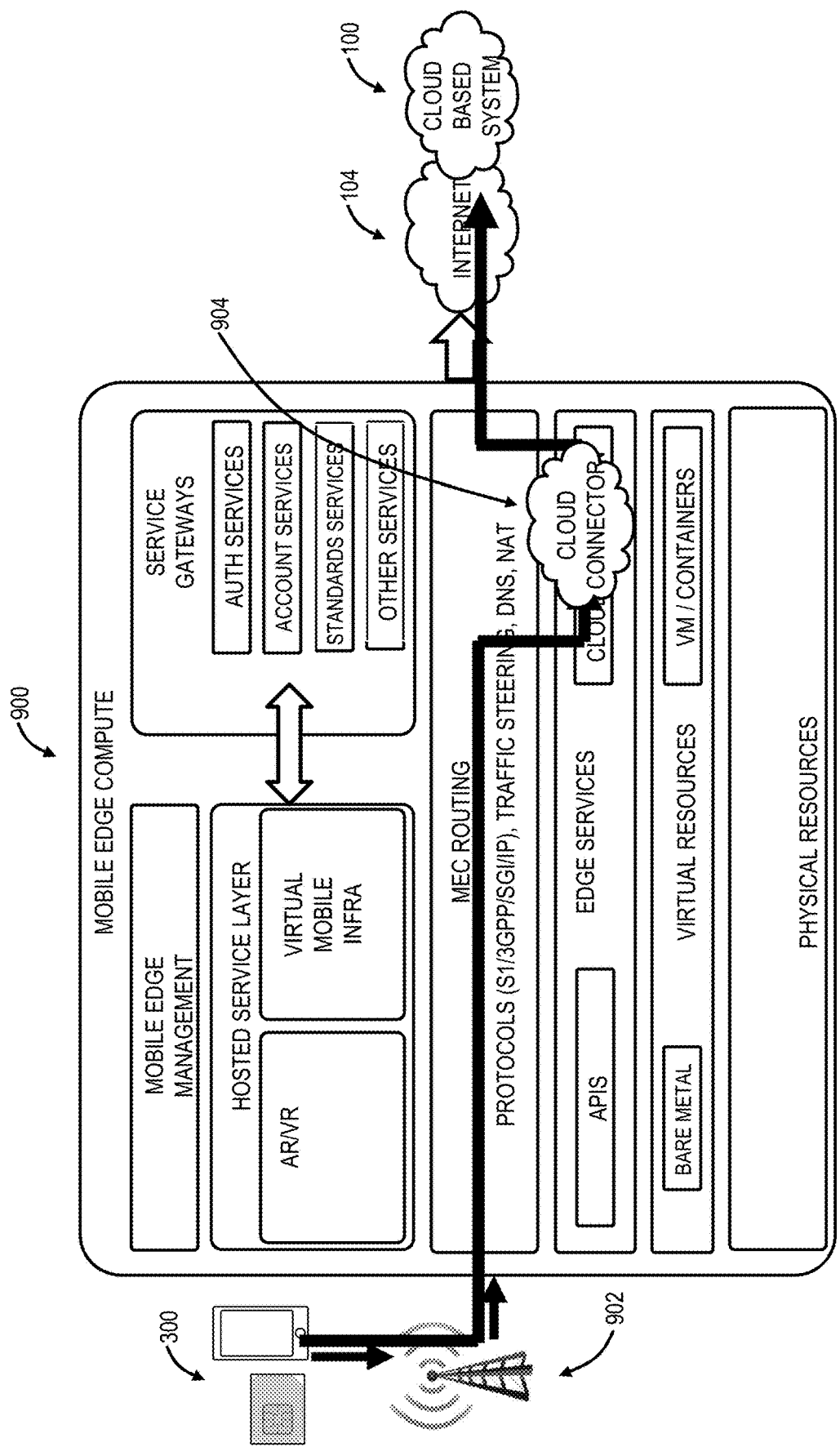
FIG. 22 is a block diagram of the MEC with a cloud connector located in the MEC edge services.

FIG. 22 is a block diagram of the MEC 900 with a cloud connector 904 located in the MEC edge services. Here, the cloud connector 904 is hosted in the MEC 900 and configured to forward traffic to a node 150 in the cloud-based system 100. For example, the node 150 can be a public node or a private node. In an embodiment, the node 150 can be hosted in the MEC 900 as well. MEC-based nodes 150 can be only available to Users on the Mobile network.

Figure 23:
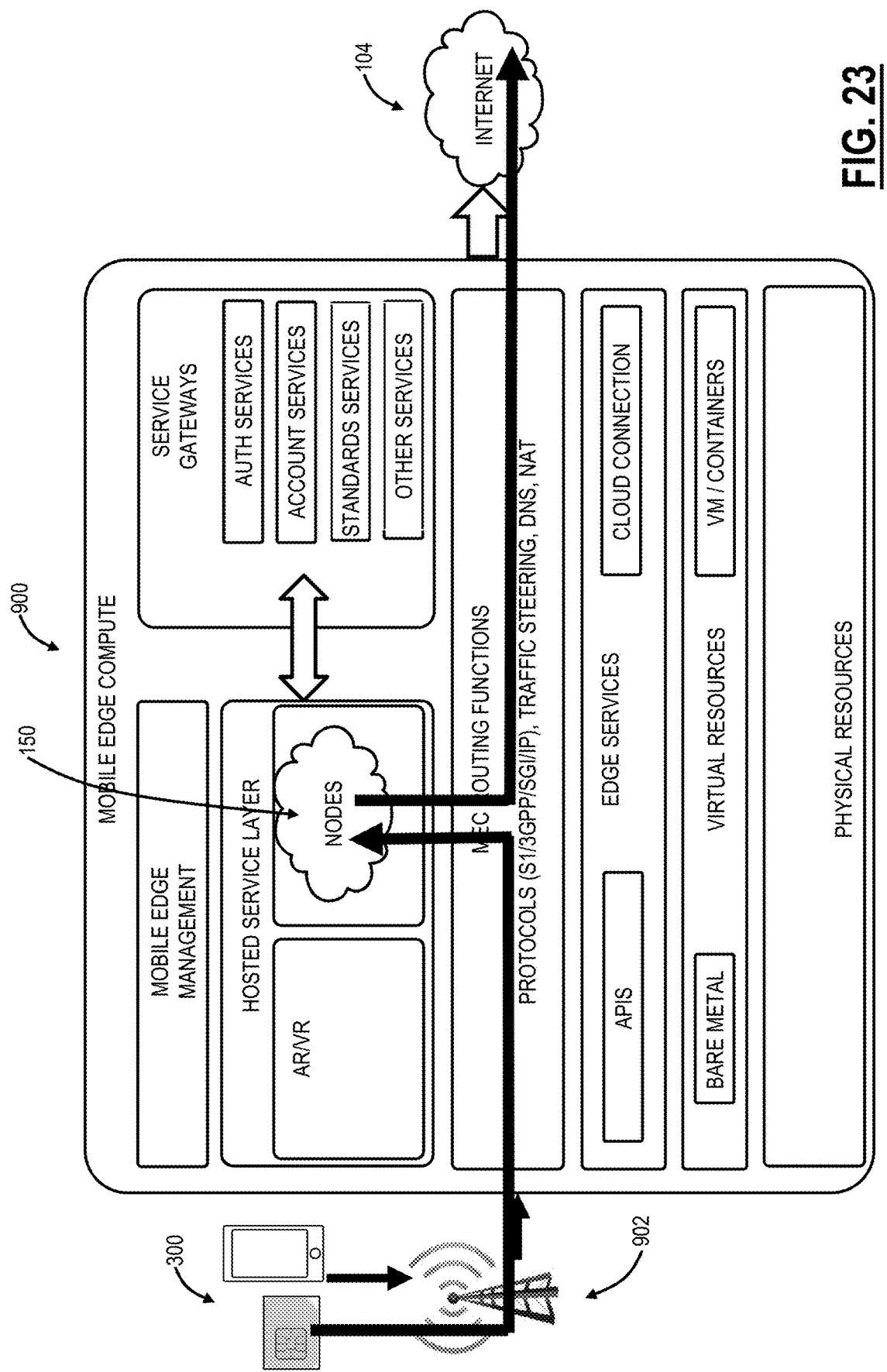
FIG. 23 is a block diagram of the MEC with nodes located in the MEC hosted service layer.

FIG. 23 is a block diagram of the MEC 900 with nodes 150 located in the MEC hosted service layer. Here, there are private nodes 150 configured within the MEC 900, in the hosted service layer.

Figure 24:
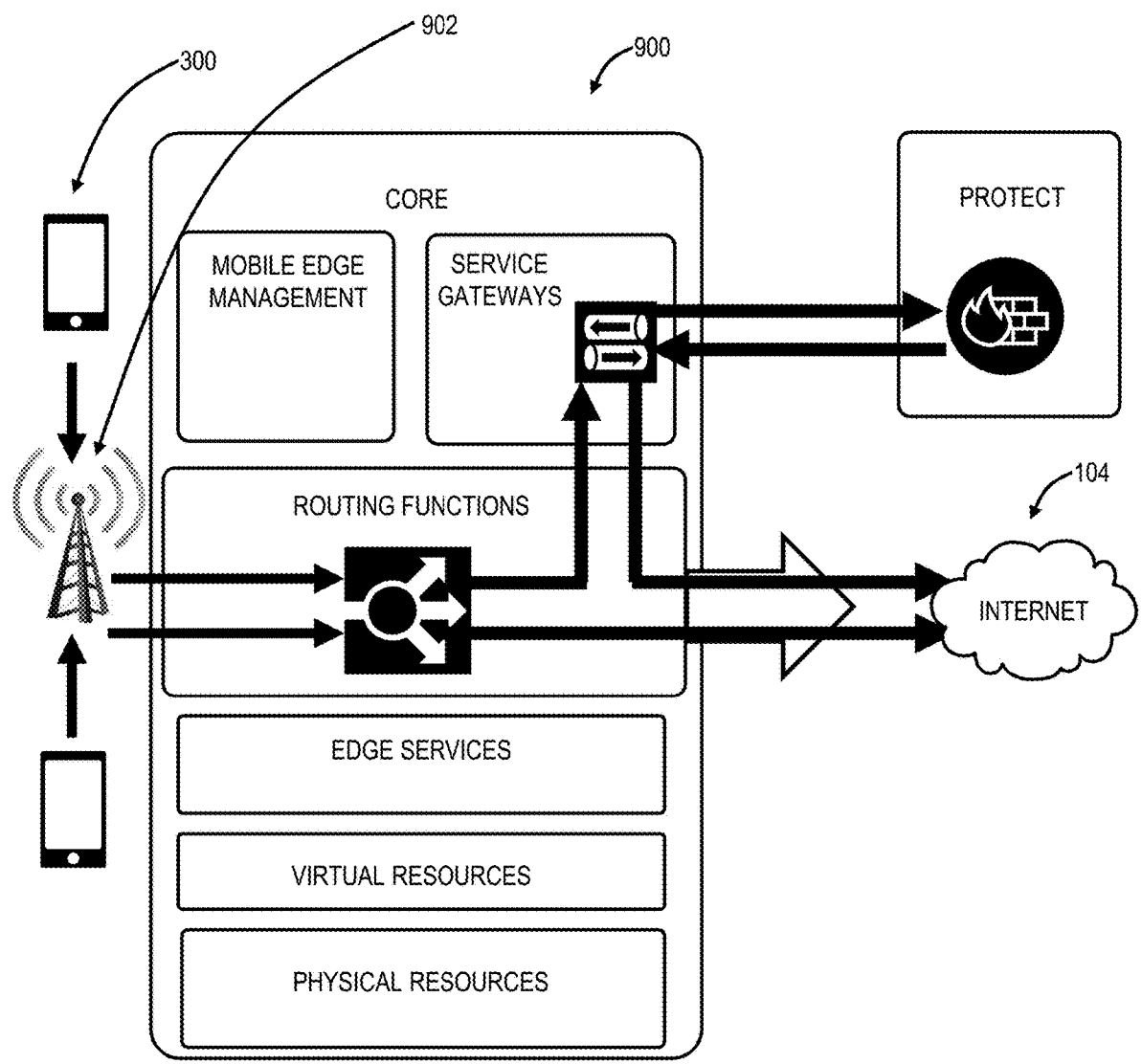
FIG. 24 is a block diagram of the MEC illustrating a traditional security service from a service provider.

FIG. 24 is a block diagram of the MEC 900 illustrating a traditional security service from a service provider. Here, the service provider has to reroute traffic from the MEC 900 to a separate service.

Figure 25:
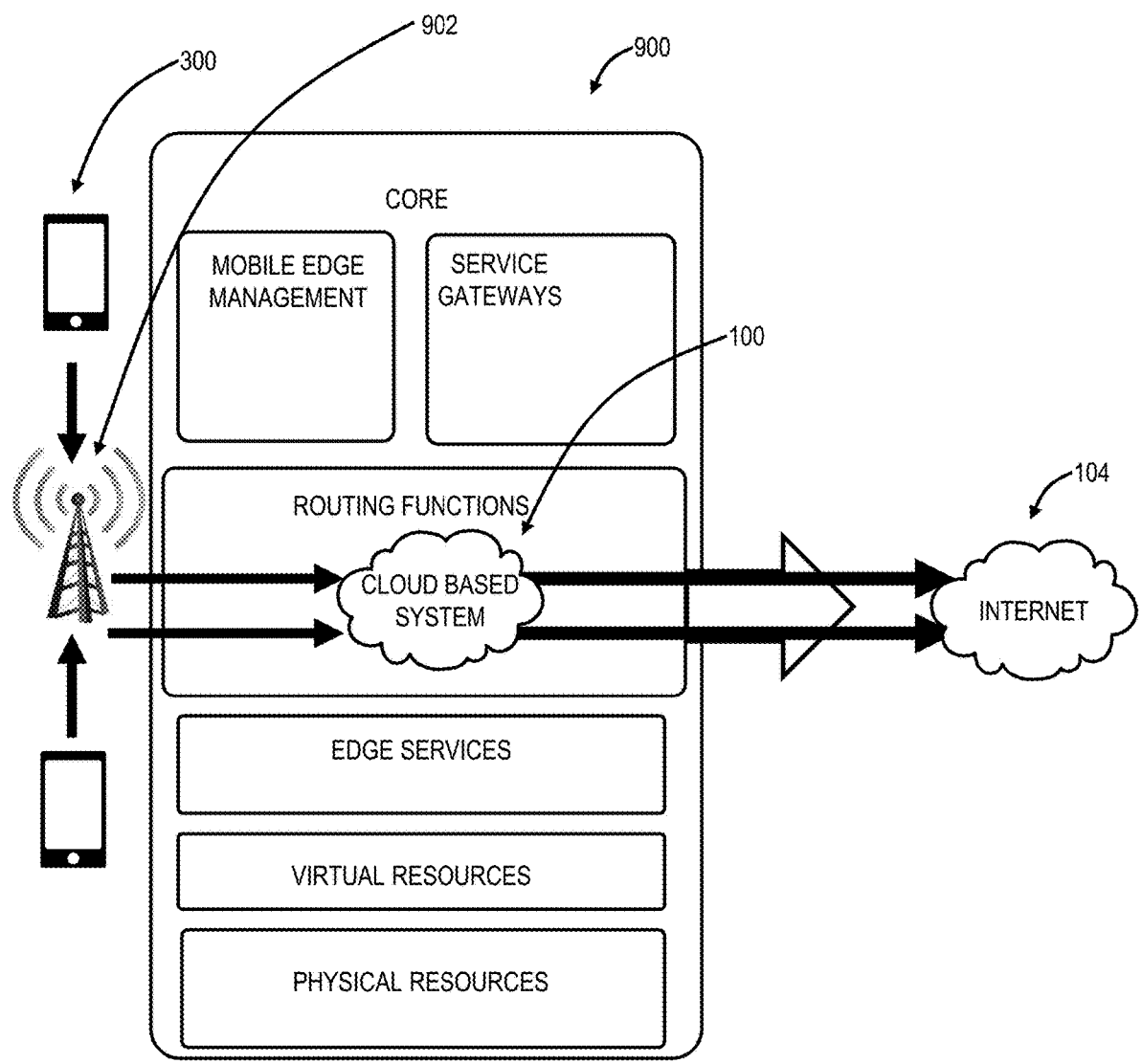
FIG. 25 is a block diagram of the MEC illustrating integration of cloud-security services in the MEC.

FIG. 25 is a block diagram of the MEC 900 illustrating integration of cloud-security services in the MEC 900. Here, the functionality of the nodes 150 are provided within the MEC routing functions. Advantageously, the approach provides improved latency, offers additional services for the service provider, and the like.

§ 14.0 Intelligent Edge Steering

Figure 26:
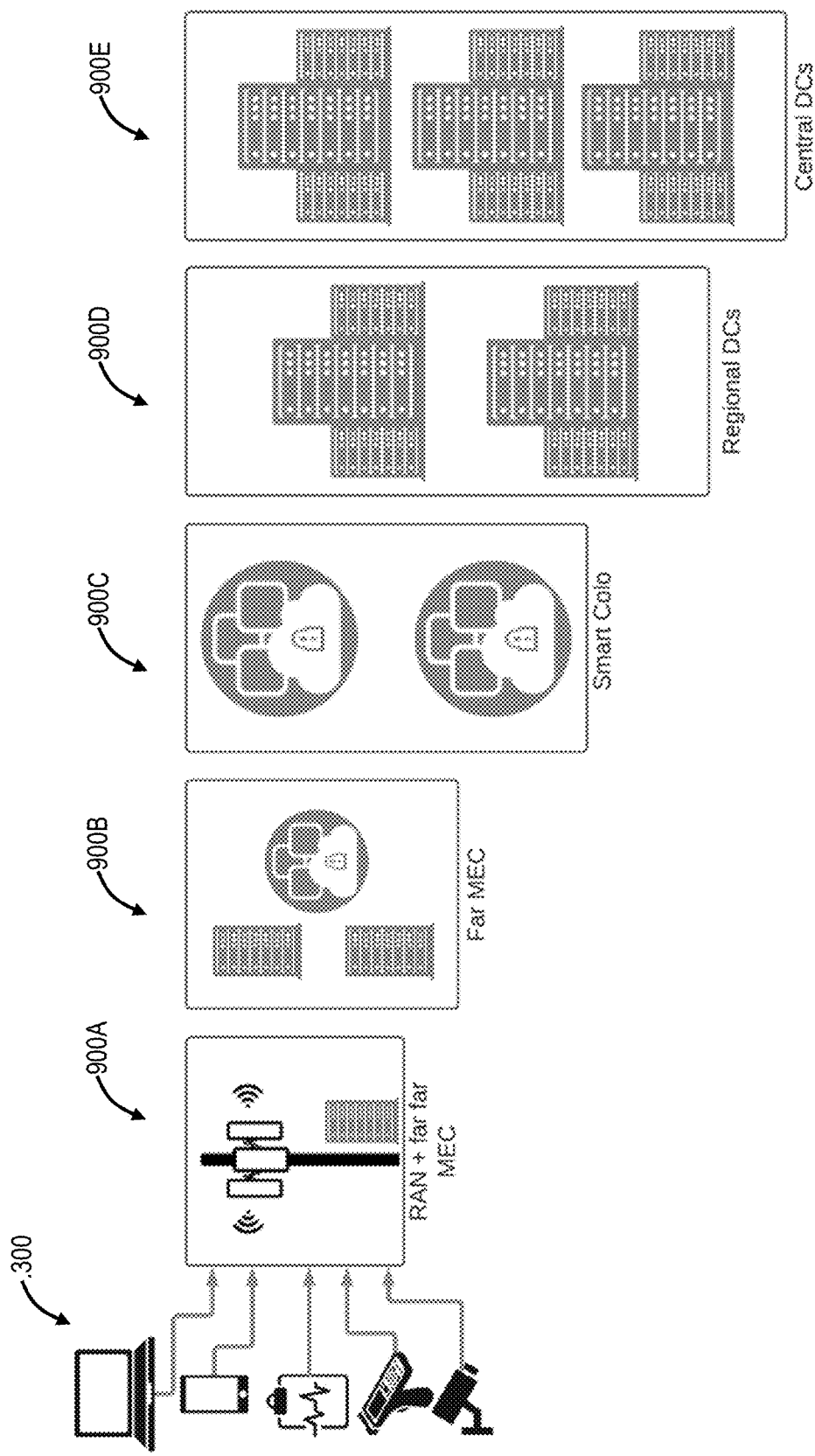
FIG. 26 is a network diagram of common edge and sizes encountered when accessing workloads from UE.

FIG. 26 is a network diagram of common edges and sizes encountered when accessing workloads from UE 300. The desire to deploy compute edges closer and closer to the end user (or service) requires smaller and smaller form factors to be deployed. In this example, there are various MECs 900A-900E. Within a controlled data center (e.g., the MECs 900D, 900E) or edge hosting facility (e.g., the MEC 900C), it is possible to run fully sized 19" and racked equipment for hosting edge solution components. Whereas an edge location may be as large as a data center or as small as a box of cards in an uncontrolled, harsh landscape such as a shipping container or farm vehicle, e.g., the MECs 900A, 900B.

The smaller the physical device is, the less powerful the compute functions are available to run workloads. Edge compute, such as with the multi-access edge compute MEC for 5G solutions will, if overwhelmed, act as a bottleneck for traffic passing from a wireless tower to the core, via the MECs. As edge compute evolves, there will be no "one size fits all" edge. Nor will all services be served from an edge. There will be requirements to connect and protect all sizes of workloads at many edge sites of varied compute/storage/network capabilities.

§ 14.1 Proposed Solution with the Cloud-Based System

The goal is to provide a solution that actively makes decisions about "how" and "where" to send traffic based on the topology of the data paths through the various Edge compute resources involved in a given customer use case. This solution needs to be broken down into three separate segments as shown in Table 1.

TABLE 1

Overview of the needed functions for dynamic steering

| Identification of traffic | Steering mechanism | Reception and processing |
| --- | --- | --- |
| Governance and Tracking, to ensure all traffic is delivered correctly. Make sure traffic is not only steered, but monitors which path it follows, which edge nodes are available and how to use them | Understand the source traffic, its traffic type and destination location and/or type (e.g., known as basic website or low latency services AR/VR). | Reception and processing of traffic should be executed only if forwarded from a trusted forward node. Not an open gateway |
| Mechanism to actively identify traffic type & map this to possible steering actions. An example would be: Source traffic from local UE in EMEA Is SSL encrypted Going to a destination in USA Forward to SSL decryption edge in smart Colo in USA This mechanism would require active input from the steering and processing functions Transparent to UE device - there should be little to zero awareness from the UE that this steering is happening | Steering must follow an intelligent path defined by the governance process. Traffic must be steered securely, against interception or unauthorized inspection, including protection from quantum and other emerging decryption attacks. e.g., decision to encrypt previously unencrypted traffic Steering should have fail-over options should the initial path be interrupted. Pinned flows for the UE over any edge. Should a device move from RAN to RAN or to new MEC, the traffic flow should "follow the UE device" | Controls are applied as per security policy. Traffic is enforced and sent to destination. Any return content is returned via the state session established between reception/reception node - then "returned" to UE via the established tunnel |

The present disclosure includes an active set of processes that will assess all parts of a UE-to-workload traffic flow. This assessment will deliver a decision that instructs the forwarding platform on how to send this traffic. The platform decision will be made based on, but no limited to: i) Security Policy of the client, ii) ML knowledge of services, iii) The type of traffic, and iv) The location of the destination service.

By making these intelligent decisions on traffic flow, a cloud service can actively send traffic to the best and/or most effective processing node. Thus, optimizing the use of the "best compute" for that resource. e.g., UE is in EMEA, Primary Edge is in EMEA, Destination workload is in USA, Policy defined to SSL decrypt. Decision is to decrypt, but not at the local Edge—as it would be more effective to decrypt at an edge that is closer to the destination, thus saving edge compute close to the UE.

§ 14.2 Value

Beyond the direct value of steering the right user to the correct destination, the information collected in real time of workload components sourced from different technology providers (cloud, telco, etc.), will be useful to determine which offered data flow paths reduce Total Cost of Ownership (TCO). Thus, offering the customer data that is useful to determine which technology provider provides the most cost-effective location and/or path for end-to-end access to workloads has value.

The goal is to provide a solution that makes decisions actively about "how" and "where" to send traffic based on the total cost (as defined by latency, bandwidth costs, path pricing, and other customer-defined value measures). For example, additional values to the decision could be (but are not limited to):

Cost of compute at edge vs destination—for more cost-effective compute

Latency budget/bandwidth budget compared against actual network traversal costs

Bypass decisions that could include a default function for unknown traffic flow (e.g., block/allow) and other metrics defined by the customer.

This also allows workload providers the ability to select exactly where a workload may appear for a user and enforce local connectivity when appropriate (e.g., deliver a local version of a service rather than remove or route to a cloud service.

§ 14.3 Technical Details

Figure 27:
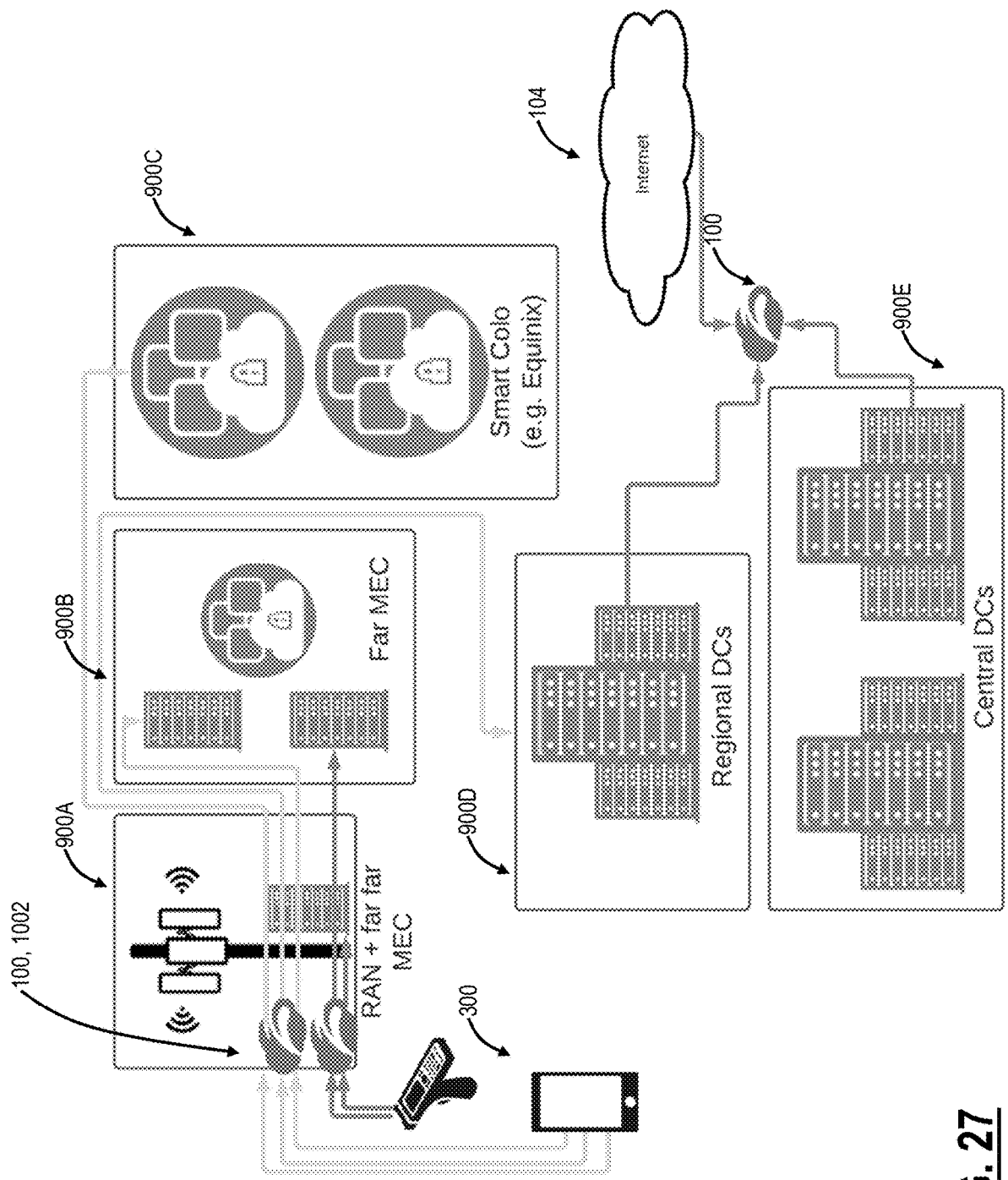
FIG. 27 is a diagram of multi-workload access using the cloud-based system providing edge and cloud solutions.
Figure 28:
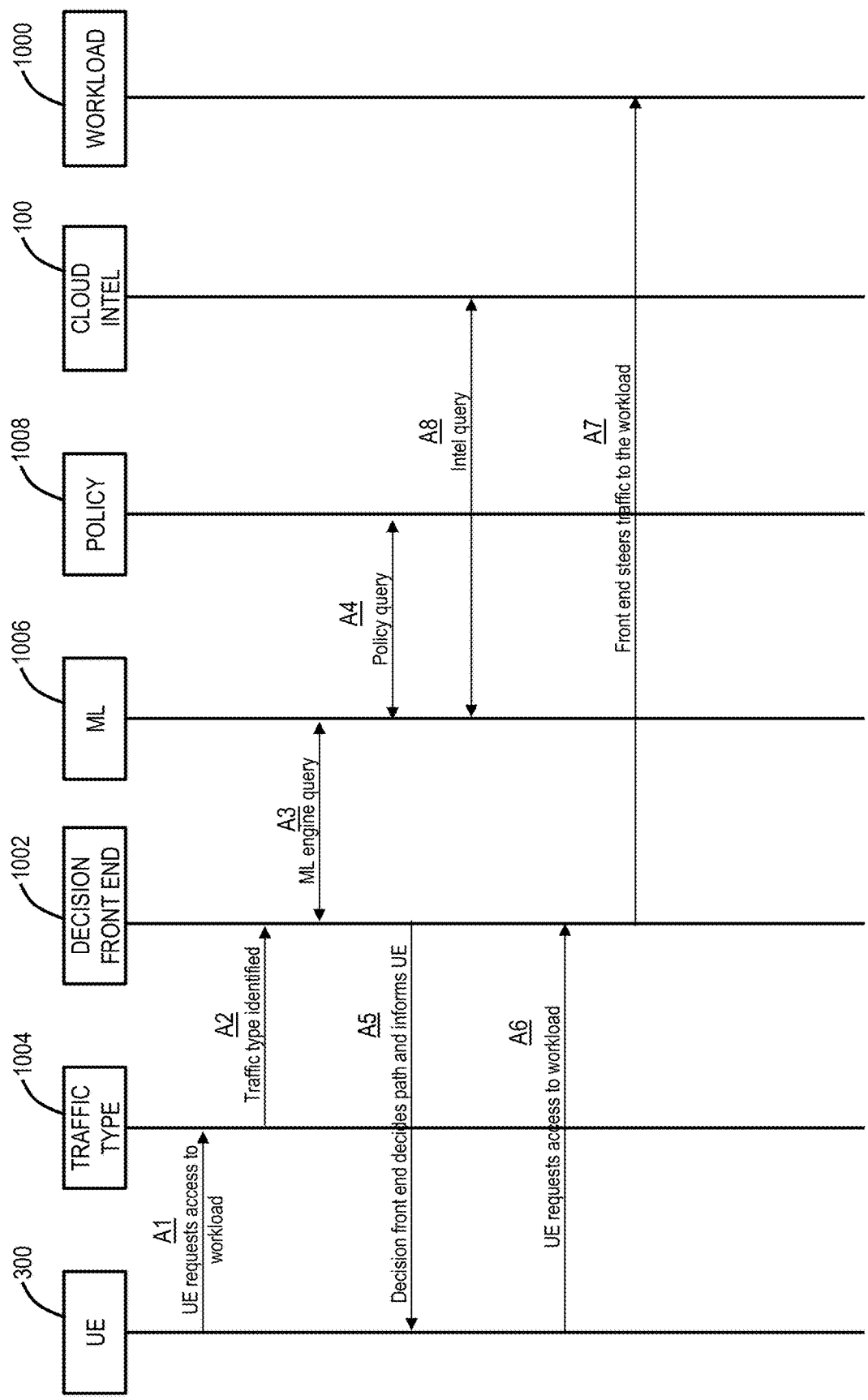
FIG. 28 is a flow diagram of selective edge flow between the UE and a workload with the cloud-based system in-between for selective dynamic steering.

FIG. 27 is a diagram of multi-workload access using the cloud-based system 100 providing edge and cloud solutions. FIG. 28 is a flow diagram of selective edge flow between the UE 300 and a workload 1000 with the cloud-based system 100 in-between for selective dynamic steering. Specifically, the cloud-based system 100 provides functions including a decision front end 1002 between the UE and the first MEC 900, and cloud intelligence between the end MECs 900D, 900E and the workload 1000, which can be on the Internet 104 or accessible therethrough. This intelligent traffic path steering allows for traffic to pass through an edge securely and uninterrupted or manipulated by other services, owners, or solutions. In addition, it allows for policy driven decisions as to which path to take to enable the workload in question.

To deliver the depicted flow in FIG. 27, there needs to be various steps of assessment, inquiry, and policy enforcement to deliver the necessary traffic flow for the UE-generated request. This is illustrated in FIG. 28. The flow is between the UE 300, a traffic type detection engine 1004, the decision front end 1002, a machine learning engine 1006, a policy engine 1008, the intelligence in the cloud 100, and the workload 1000.

The cloud-based system 100 includes functionality integrated in a first MEC for the traffic type detection engine 1004 and the decision front end 1002, such as the MEC 900A. Of course, it could be in other MECs 900. The decision front end 1002 will need to intelligently identify which traffic should be steered and how. Delivering this requires active insights from a collection of data points, that are assessed and communicated at regular intervals.

In an example, the UE 300 requests access to a workload 1000 (step A1). The traffic type detection engine 1004 is configured to identify the traffic type (step A2) for the decision front end 1002 which queries the machine learning engine step 1006 (step A3). The traffic type detection engine 1004, the decision front end 1002, the machine learning engine step 1006, and the policy engine 1008 are functions and can be integrated in compute resources at one of the MECs 900. These engines 1002, 1004, 1006, 1008 can be separate or combined modules, that is this description is functional. The machine learning engine 1006 can perform a policy query for the identified traffic type (step A4). The decision front end 1002 receives the machine learning query and decides the path based thereon and informs the UE 300 (step A5).

The UE 300 again requests the workload 1000 (step A6), and the decision front end 1002 steers the traffic towards the workload 1000 (step A7). Periodically, the machine learning engine 1006 can receive intelligence from the cloud-based system 100 (step A8), such as types of workloads, steering, policy, etc.

§ 15.0 Workload Isolation

Edge compute, in the MEC 900, is a collection of software-driven services that will be hosted physically closer to end users and solutions than on-premises data centers or public/private clouds. The nature of this edge is to leverage the software-driven interconnects to deliver local and low-latency compute to UE 300)—defined as end-user devices connecting to edge compute via wireless, or other network connectivity). Edge compute services will provide local connections from UE 300 to locally hosted edge services. Communication will use common network routable protocols and network functions. This will expose workloads to anyone or anything that shares this network context.

Figure 29:
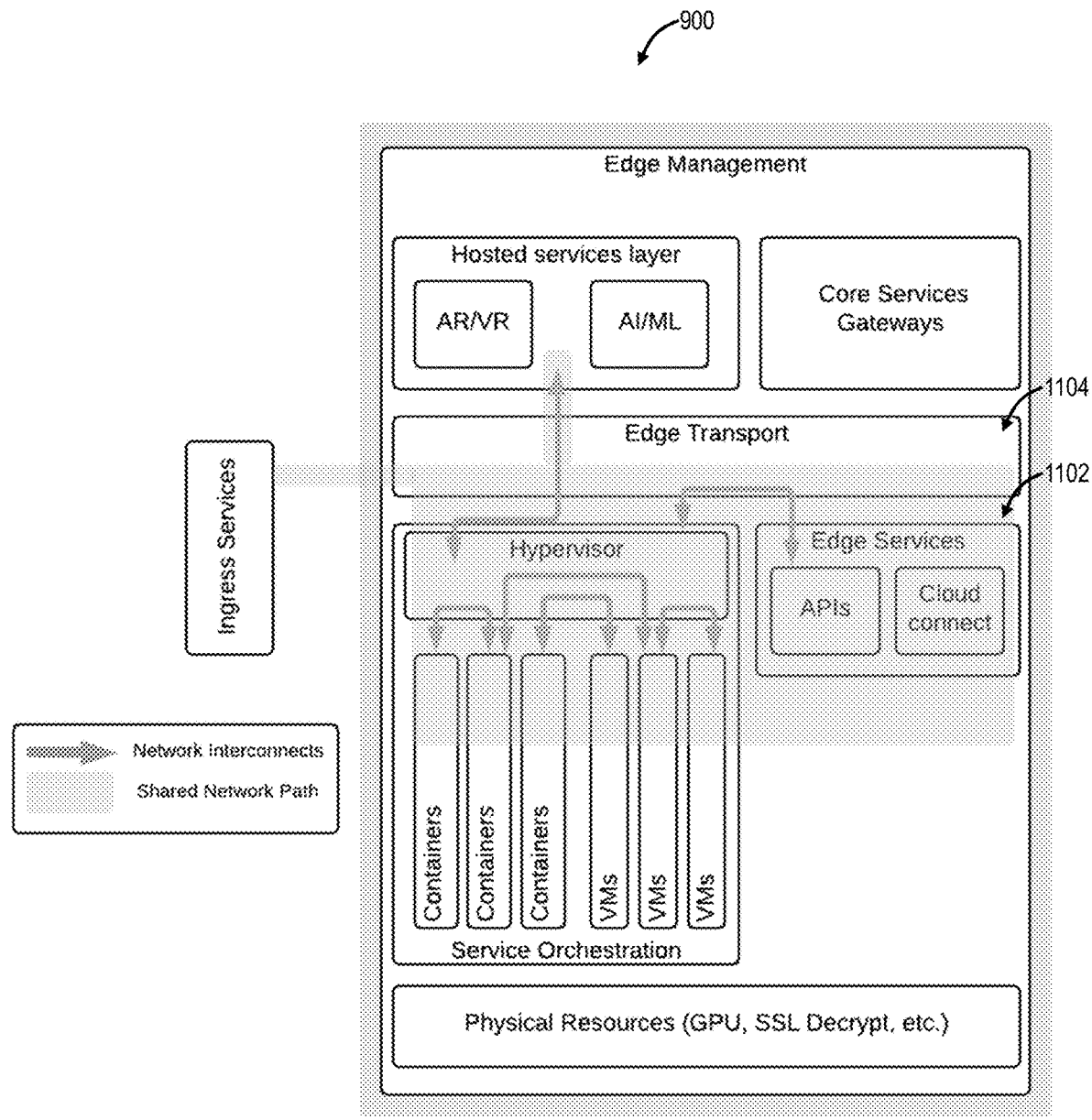
FIG. 29 is a diagram of intra edge connectivity between various services, over a shared transport network.

FIG. 29 is a diagram of intra edge connectivity in a MEC 900 between various services 1102, over a shared transport network 1104. To address this shared context, ideas for isolation have been proposed and rely on the virtualized network layer. An example often given is to share a network but to firewall-off access between each zone, between workloads, or some combination of the two. By utilizing network-based security services, all connectivity and protection is reliant on network security and its context, e.g., users and services must have a shared network context to be able to access services.

§ 15.1 Workload Isolation Solution

The present disclosure proposes using the foundational components of zero trust to control application access paths. Zero trust outlines that no service is accessible until validating the access conditions of the requestor. Before validation, there is no access or even visibility to any service or workload, rendering it "hidden" to the network. Workloads will only ever have a context to their hosted cloud service.

The cloud-based system 100 is used to implement a zero-trust layer for edge hosted workloads—ensuring that no workload or service can speak-to or observe anything without first receiving validation. Workloads can exist within networks, subnets, functions, etc. but will not be able to communicate without validation. This validation of access must occur at the substantiation of each connection—and there must never be permanent access granted or re-use of connections. Each access path is unique to the specific session and then torn down and forgotten at session completion.

A cloud service via the cloud-based system 100 only allows connections from authorized users, which is established through:

i) Outbound path for control/signaling
ii) Outbound path for data channel establishment
iii) Internal cloud service will, only after approval, create a connection between it and the destination workload. The workload will only ever see sessions from the cloud service and nothing else.

All traffic between the cloud service, including (but not limited to) signaling and workflows, must be over an encrypted tunnel ensuring zero capability for interception or manipulation of the service access or function within the Edge. Thus, the service is only available to those who are allowed to access it and nothing more.

Figure 30:
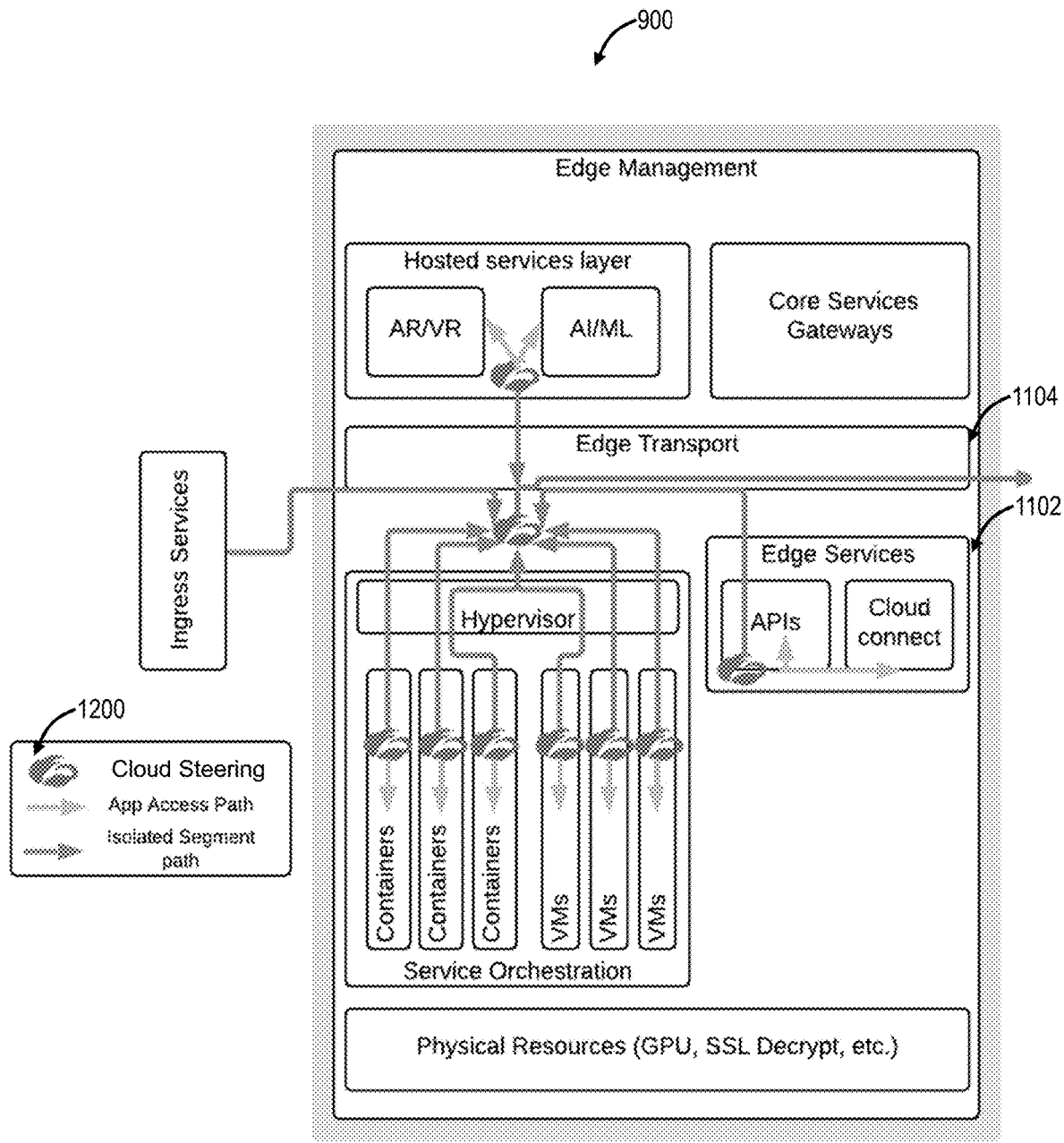
FIG. 30 is a network diagram of a MEC illustrating cloud service-based edge isolation.

FIG. 30 is a network diagram of a MEC 900 illustrating cloud service-based edge isolation. This secure traffic path steering allows for traffic to pass securely through an edge, uninterrupted or manipulated by other services, owners or solutions. In addition, it allows for policy driven decisions about which path to take to enable the workload in question.

As depicted in FIG. 30, a set of cloud services 1200 allows for any application or workload within the Edge Compute to have traffic correctly and securely steered to it. Regardless of the transport or service interconnect layers, traffic passes securely to only the required workload and nothing else. This design is capable of being deployed within physical or virtual edge compute locations. For example, within locations provided by a hyperscaler, or on premises, or hosted on portable edge compute.

§ 16.0 Secure Edge Steering

Figure 31:
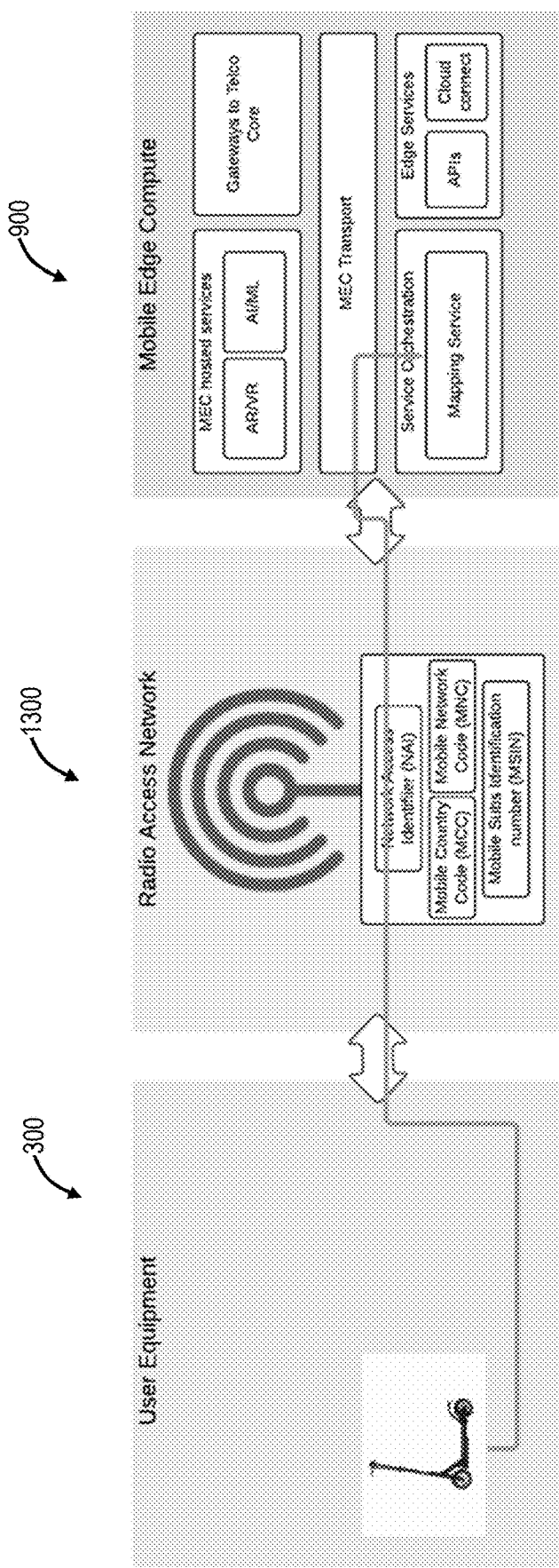
FIG. 31 is a diagram of UEs connected to edge hosted services without intelligent steering.

FIG. 31 is a diagram of UEs connected to edge hosted services without intelligent steering. Edge compute services will enable low-latency access from User Equipment (UE) to locally hosted edge services, such as the Multi-Access Edge Compute (MEC) 900. This connectivity will use common network routable protocols that will ensure traffic is passed between UE 300 and workloads via TCP/IP based controls (similar to the physical- or hypervisor-based routing mechanisms). Like traditional physical or logical controls, security is often overlooked or network centric. This includes security solutions that do not limit lateral motion of malicious software infecting UE or MEC workloads.

Connectivity within these edge hosted orchestration platforms, for example a RAN connected smart device (UE) connected to a MEC-hosted mapping service, rely on a shared TCP/IP network context. The smart device needs to have a direct routing path to the edge mapping service. This implies that any UE and any RAN-connected service will need network level connectivity to the MEC-hosted services. The nature of a shared network context exposes applications/services to unwanted use or even attack and ultimately penetration. Any edge hosted service that can receive a packet from the UE opens itself up to risk.

§ 16.1 Edge Compute Architecture Overview

Figure 32:
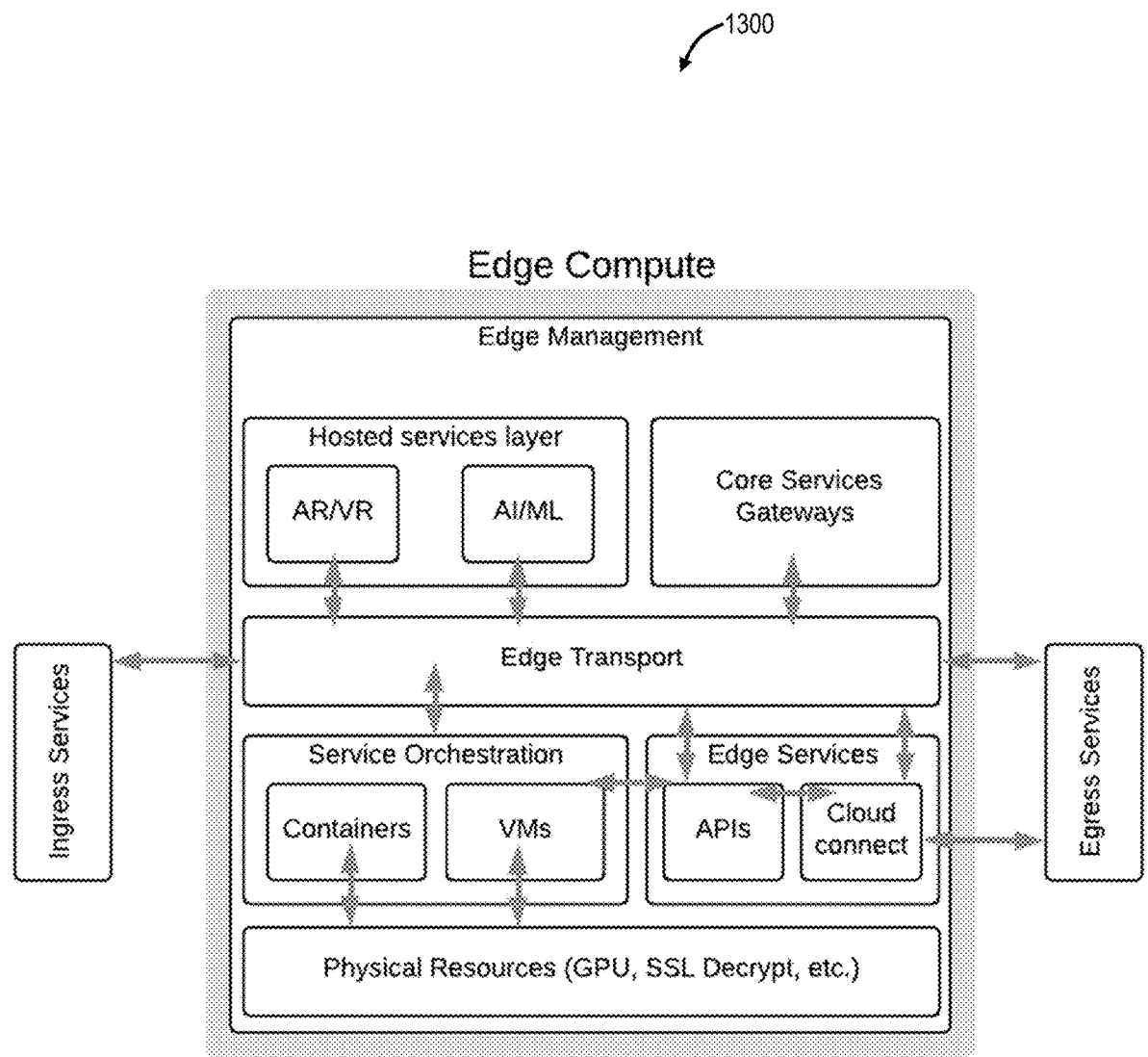
FIG. 32 is a diagram of possible edge compute components.

FIG. 32 is a diagram of possible edge compute 1300 components. Edge compute 1300 includes multiple form factors depending on use case. Within the Cellular/Mobile network, it is an ETSI-Defined architecture used to bring compute and control closer to the end subscriber or user equipment (UI). Running these compute and control services within a near-real-time environment allows for better user experience for current and future services.

The edge compute 1300 ecosystem does rely on virtualized and containerized application services that would be controlled through open standard hypervisors and/or Application Programming Interfaces (APIs). The virtualization of compute will allow for dynamic service chaining of all forms of applications to be consumed at the edge.

The edge compute 1300 will also provide gateway interconnects to cloud services, telecommunications cores, augmented and virtual reality providers, etc. This enables edge compute providers to move workloads from edge to edge, end to on-premises data center, and edge to cloud depending on the end user/workload use case.

The UE 300 will send traffic to the ultimate consumption destination, through the demonstrated edge transport of the edge compute platform. The edge will either direct traffic directly through and egress the edge without applying any control, or it will direct the traffic to an internally hosted service. This decision will generally be controlled by the edge management of the hypervisor layer of an edge. The actions will then be represented through traffic routing decisions in the edge transport layer/virtual switch. The action will be to send traffic either external or internal within the edge compute engine. The traffic passing through this switch or transport layer is exposed to the same network-based risks of any open/shared TCP/IP network—e.g., interception, manipulation, abuse, etc.

§ 16.2 Intelligent Steering Solution

Using an intelligent control service within the edge compute 1300 system, the cloud-based system 100 can affect three key outcomes to traffic traversing the Edge:

1) Overlay all controls and abstract the path steering to the overlay, on top of the network.
2) Steer the path locally, within the edge (or externally of the edge) directly to the required service
3) Ensure all traffic passing through the service, on to its destination (in the edge or externally) is end-to-end encrypted with zero exposure of content to neighboring networks, services, administrators, user etc.

Figure 33:
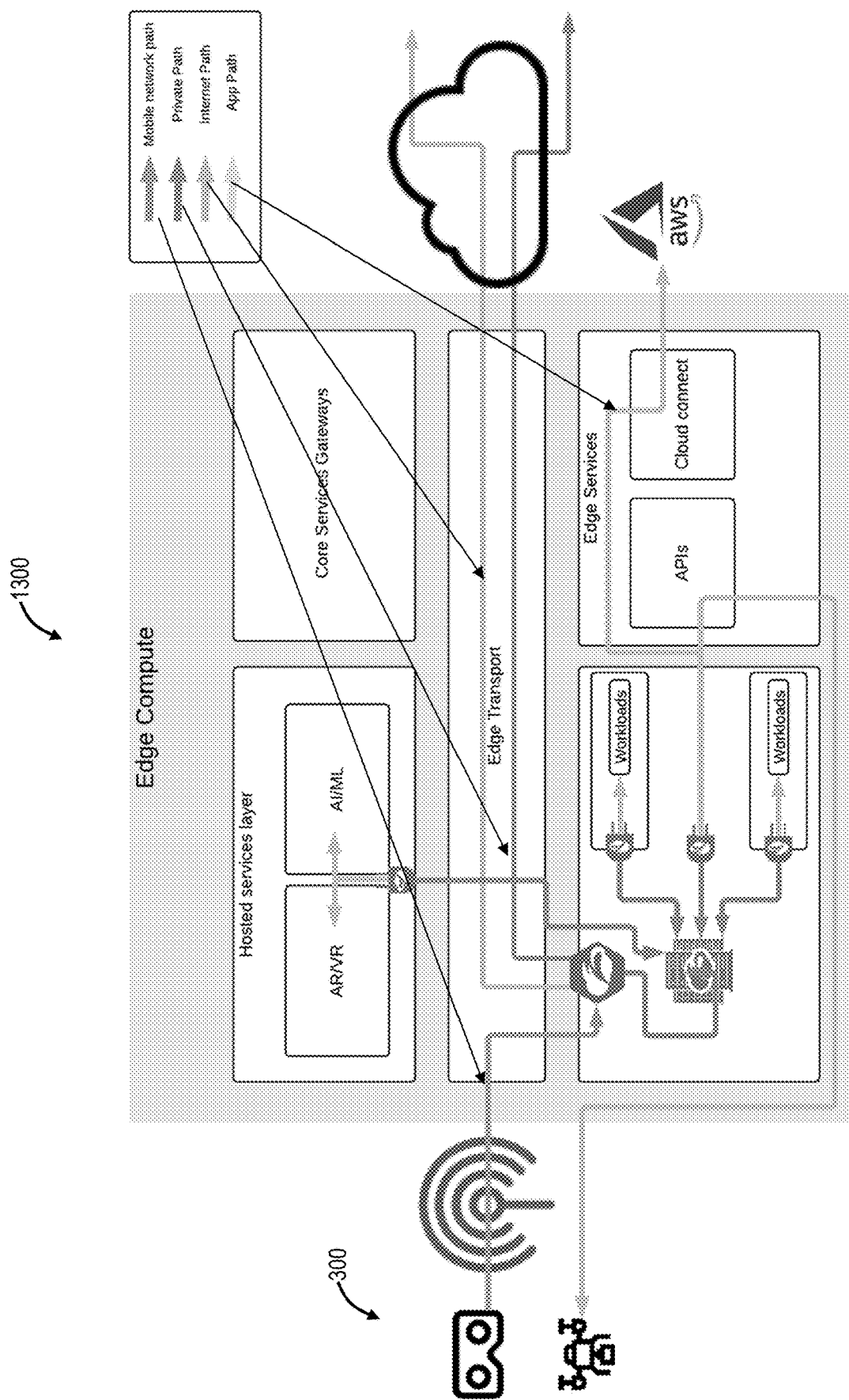
FIG. 33 is a diagram of cloud edge hosted steering deployment for any type of wireless or other means of transport between UE and the edge compute.

FIG. 33 is a diagram of cloud edge hosted steering deployment for any type of wireless or other means of transport between UE 300 and the edge compute 1300. This steering of the traffic path allows for the traffic not only to pass through an edge (securely and uninterrupted or manipulated by other services, owners or solutions) but more importantly deciding which path to take to the workload in question.

As depicted in FIG. 33, cloud services allow for any application or workload within the Edge Compute 300 to have traffic correctly and securely steered to it. Regardless of the transport (wireless or wired) or service interconnect layers, traffic passes securely to only the required workload and nothing else. This design is capable of being deployed within physical or virtual edge compute locations. For example, within hyperscaler provided locations or on-premises or hosted on portable edge compute.

§ 17.0 Conclusion

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a Read-Only Memory (ROM), a Programmable Read-Only Memory (PROM), an Erasable Programmable Read-Only Memory (EPROM), an Electrically Erasable Programmable Read-Only Memory (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

The foregoing sections include headers for various embodiments and those skilled in the art will appreciate these various embodiments may be used in combination with one another as well as individually. Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method of cloud-based 5G security, implemented in a Multi-Access Edge Compute (MEC) system, comprising:
   receiving a request for compute resources from User Equipment (UE);
   validating in edge transport defining a virtual switch in the MEC a user of the UE for the compute resources;

responsive to the user being authorized, creating a connection between the UE and a destination of the compute resources;
responsive to the user being unauthorized, rendering the compute resources as hidden from the UE.

2. The method of claim 1, further comprising utilizing a cloud-based system configured to implement a zero-trust layer for edge-hosted workload control and signaling the connection.

3. The method of claim 2, wherein the cloud-based system is connected to the MEC via an encrypted tunnel adapted to be non-reliant on underlying mobile network transports.

4. The method of claim 1, wherein the compute resources are hosted locally at the MEC for lower latency applications.

5. The method of claim 1, further comprising performing the validating for each substantiation of the connection.

6. The method of claim 1, further comprising tearing down the connection at session completion.

7. A Multi-Access Edge Compute (MEC) system comprising:
one or more servers each including at least one processor and memory storing instructions that, when executed, cause the at least one processor to receive a request for compute resources from User Equipment (UE);
validate in edge transport defining a virtual switch in the MEC a user of the UE for the compute resources;
responsive to the user being authorized, create a connection between the UE and a destination of the compute resources;
responsive to the user being unauthorized, render the compute resources as hidden from the UE.

8. The MEC system of claim 7, wherein the instructions, when executed, cause the at least one processor to
utilize a cloud-based system for control and signaling the connection.

9. The MEC system of claim 8, wherein the cloud-based system is connected to the MEC via an encrypted tunnel.

10. The MEC system of claim 7, wherein the compute resources are hosted locally at the MEC for lower latency applications.

11. The MEC system of claim 7, wherein the instructions, when executed, cause the at least one processor to
perform the validate for each substantiation of the connection.

12. The MEC system of claim 7, wherein the instructions, when executed, cause the at least one processor to
tear down the connection at session completion.

13. A non-transitory computer-readable storage medium having computer-readable code stored thereon for programming a Multi-Access Edge Compute (MEC) system to perform steps of:
receiving a request for compute resources from User Equipment (UE);
validating in edge transport defining a virtual switch in the MEC a user of the UE for the compute resources;
responsive to the user being authorized, creating a connection between the UE and a destination of the compute resources;
responsive to the user being unauthorized, rendering the compute resources as hidden from the UE.

14. The non-transitory computer-readable storage medium of claim 13, wherein the steps further include
utilizing a cloud-based system for control and signaling the connection.

15. The non-transitory computer-readable storage medium of claim 14, wherein the cloud-based system is connected to the MEC via an encrypted tunnel.

16. The non-transitory computer-readable storage medium of claim 13, wherein the compute resources are hosted locally at the MEC for lower latency applications.

17. The non-transitory computer-readable storage medium of claim 13, wherein the steps further include
performing the validating for each substantiation of the connection.

18. The method of claim 1, further comprising directing the traffic traversing the edge transport with an intelligent steering solution defining at least one key outcome.

* * * * *